US 8,081,196 B2

(12) United States Patent
Zaklika et al.

(10) Patent No.: US 8,081,196 B2
(45) Date of Patent: *Dec. 20, 2011

(54) ASSISTED ADAPTIVE REGION EDITING TOOL

(75) Inventors: Krzysztof Antoni Zaklika, St. Paul, MN (US); Mikhail Ivanovich Trifonov, Sosnovyi Bor (RU); Leonid Borisovich Lalyko, St. Petersburg (RU); Viktor Antol'evich Nesterov, St. Petersburg (RU); Pavel Vladimirovich Gruzdev, St. Petersburg (RU)

(73) Assignee: Corel Corporation, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/848,241

(22) Filed: Aug. 2, 2010

(65) Prior Publication Data

US 2011/0012922 A1    Jan. 20, 2011

Related U.S. Application Data

(63) Continuation of application No. 10/955,557, filed on Sep. 30, 2004, now Pat. No. 7,782,338.

(60) Provisional application No. 60/545,654, filed on Feb. 17, 2004.

(51) Int. Cl.
*G09G 5/00*     (2006.01)
*G06K 9/62*     (2006.01)

(52) U.S. Cl. ........ 345/619; 382/163; 382/164; 382/224; 382/225

(58) Field of Classification Search .................. 345/619; 382/163, 164, 224, 225

See application file for complete search history.

(56) References Cited

U.S. PATENT DOCUMENTS

| 5,630,037 | A  | 5/1997  | Schindler       |
|-----------|----|---------|-----------------|
| 5,739,809 | A  | 4/1998  | McLaughlin et al. |
| 5,885,218 | A  | 3/1999  | Teo et al.      |
| 5,896,468 | A  | 4/1999  | Kowalski        |
| 6,385,336 | B1 | 5/2002  | Jin             |
| 6,434,269 | B1 | 8/2002  | Hamburg         |
| 6,718,068 | B1 | 4/2004  | Gindele et al.  |
| 6,791,573 | B2 | 9/2004  | Hamburg         |
| 6,934,421 | B2 | 8/2005  | Gindele et al.  |
| 6,987,876 | B2 | 1/2006  | Silber et al.   |
| 7,013,021 | B2 | 3/2006  | Sharma et al.   |
| 7,016,011 | B2 | 3/2006  | De Haan         |
| 7,092,554 | B2 | 8/2006  | Chen et al.     |
| 7,102,649 | B2 | 9/2006  | Kotani et al.   |
| 7,136,081 | B2 | 11/2006 | Gritz et al.    |

(Continued)

OTHER PUBLICATIONS

Adobe Creative Team "Adobe Photoshop CS Classroom in a Book", Dec. 1, 2003, Adobe Press, pp. 123-124.

(Continued)

*Primary Examiner* — Jeffrey Chow
(74) *Attorney, Agent, or Firm* — Patterson & Sheridan, LLP

(57) ABSTRACT

Properties of pixels of a digital image are sampled within different subdivisions of an editing tool impression to produce different pixel property distributions. The property distributions from each region may be automatically classified to identify different edit classes within the property space, which are then used to apply an edit effect to the digital image within the tool impression. The edit classes are represented by an edit profile, the generation of which may be completely automated based on selection of a tool impression, or partially automated using the selection of the tool impression and receipt of classification guidance input, such as one or more parameters received from user input or a configuration file. The edit classes may also be generated without reference to the pixel property distributions, such as via user input.

23 Claims, 20 Drawing Sheets

U.S. PATENT DOCUMENTS

| | | |
|---|---|---|
| 7,289,154 B2 | 10/2007 | Gindele |
| 7,312,805 B1 | 12/2007 | Worthington |
| 7,317,826 B2 | 1/2008 | Wilensky et al. |
| 7,366,357 B2 | 4/2008 | Curry et al. |
| 7,542,584 B2 | 6/2009 | Abe et al. |
| 7,609,894 B2 | 10/2009 | Zaklika et al. |
| 2003/0039402 A1 | 2/2003 | Robins et al. |
| 2004/0081346 A1 | 4/2004 | Louden et al. |
| 2006/0215922 A1 | 9/2006 | Koch et al. |
| 2010/0073401 A1 | 3/2010 | Zaklika et al. |

OTHER PUBLICATIONS

Barret, W.A et al, "Object-Based Image Editing", ACM Trans. on Graphics, Jul. 2002, pp. 777-784, vol. 21, No. 3.

Elder, J.H. et al, "Image Editing in the Contour Domain", IEEE Trans. Pattern Analysis and Machine Intelligence, Mar. 2001, pp. 291-296, vol. 23, No. 3.

ASSISTED ADAPTIVE REGION EDITING TOOL

CROSS REFERENCE TO RELATED APPLICATIONS

This application is a continuation of U.S. patent application Ser. No. 10/955,557 entitled "Assisted Adaptive Region Editing Tool" filed Sep. 30, 2004 and U.S. Provisional Application No. 60/545,654, entitled "Assisted Adaptive Region Editing Tool" and filed on Feb. 17, 2004, each of which are incorporated herein for all that they disclose and teach.

FIELD OF THE INVENTION

The invention relates generally to image editing, and more particularly to an assisted adaptive region editing tool.

DESCRIPTION

Digital image editing has made many sophisticated graphics and multimedia editing capabilities accessible to a large number of professionals and consumers. Users can edit digital images, such as photographs, video frames, computer graphics, etc., using reasonably-priced image editing software. Such software can execute on a variety of computers, including graphics workstations, desktop computers, and laptop computers. However, depending on the user's abilities, some of these sophisticated editing capabilities may still present tasks that are too complex or too time-consuming for many users to perform with acceptable results.

One common image editing operation involves the selective editing of a region in the image. For example, given a still digital image (e.g., a digital photograph or a video frame) of a human subject, a user may wish to remove (e.g., erase) the background in the image (e.g., an office environment) and replace it with a different background (e.g., a beach scene). In one approach, region erasure of the background can be accomplished manually, pixel-by-pixel, by changing the color and/or opacity of each pixel of the background. However, not only can this approach be tedious and very time-consuming, manually determining the appropriate color and translucence of each pixel on the boundary between the subject and the background can be quite complicated. First, it can be difficult to correctly identify which pixels are actually in the human subject and which pixels are in the background, particularly when the subject has a complex shape or very fine attributes. Furthermore, some pixels include a blend of both subject and background and, therefore, may require some manual "unblending" of colors from the subject and the background to produce a satisfactory result. However, manual unblending can be extremely difficult and often unworkable for many users. Accordingly, the effort required to employ a manual approach may be unacceptable for the quality of the result achieved.

Some more automated approaches for editing a region can be used. For example, to erase a background around a subject in an image, a user may designate a clipping path that generally distinguishes the subject from the background. The region designated outside the clipping path is erased, and the boundary of the clipped region can be blurred or blended to substantially minimize the influence of the remaining background on the clipped subject. Although this clipping approach is less manual than a pixel-by-pixel approach, the approach typically relies on a user specifying the clipping path closely around the boundary of the subject in order to achieved acceptable results. The more background that remains in the clipped subject, the more influence the remaining background has on the resulting edited image—an undesirable effect. Furthermore, such blending or blurring tends to decrease the sharpness of the subject boundary, even though sharpness is frequently a primary desirable characteristic.

Other approaches employ automated visual blending techniques that do not require clipping. However, such existing approaches define an individual erasure color based on analysis of a single region of a tool impression. These approaches fail to take sufficient advantage of the instructive effort of a user, who is capable of communicating useful information about different regions within a tool impression simply by his or her placement of the tool within the image.

In addition, existing methods do not adequately consider user guidance in setting the characteristics of the image content to be edited. For example, a user may recognize that the subject includes primarily red-based coloring, which could be helpful in limiting the amount of the subject that might be edited using an automated editing too. However, existing approaches provide no facility for the user to provide guidance specifying that reddish pixels are not to be edited in an automated editing operation.

Implementations described and claimed herein provide an exemplary assisted adaptive region editing tool that samples properties (e.g., colors) of pixels in a digital image within different subdivisions of an editing tool impression to produce different property distributions. The property distributions from each region are analyzed to identify different edit classes within the property space. The different edit classes are then used to apply an edit effect to the digital image within the tool impression (e.g., changing the transparency values of individual pixels). The edit classes may be represented by an edit profile in two or more dimensions (e.g., applying to one or more pixel properties).

In one implementation, the tool receives classification guidance input that sets an edit profile characteristic for an automated editing operation. Given this setting of this first edit profile characteristic (e.g., an edit profile threshold or inflection point), other edit profile characteristics may be automatically computed based on the image content in the region being evaluated for editing.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program.

The computer program product encodes a computer program for executing a computer process on a computer system. A predetermined parameter is received. Pixels within a tool impression in a digital image are sampled to determine a distribution of a pixel property of the pixels in the tool impression. An adjustment, such as a scaling or other adjusting parameter, is computed based on the distribution of the pixel property. An assisted parameter is computed based on the adjustment and the predetermined parameter. At least one pixel within the tool impression is edited based on the predetermined parameter and the assisted parameter.

In another implementation, a method is provided. A predetermined parameter is received. Pixels within a tool impression in a digital image are sampled to determine a distribution of a pixel property of the pixels in the tool impression. An adjustment, such as a scaling or other adjusting parameter, is computed based on the distribution of the pixel property. An assisted parameter is computed based on the adjustment and the predetermined parameter. At least one pixel within the tool impression is edited based on the predetermined parameter and the assisted parameter.

In yet another implementation, a system is provided. A region sampler module samples pixels within a tool impression in a digital image to determine a distribution of a pixel property of the pixels in the tool impression. An edit profile definition generator receives a parameter, computes an adjustment (such as a scaling or other adjusting parameter) based on the distribution of the pixel property, and computes an assisted parameter based on the adjustment and the parameter. An editing module edits at least one pixel within the tool impression based on the parameter and the assisted parameter.

Other implementations are also described and recited herein.

An exemplary assisted adaptive region editing tool samples one or more properties (e.g., colors, texture) of pixels in a digital image within different subdivisions of an editing tool impression to produce different property distributions. Generally, an editing tool combines an image region designation, typically via a user interface, and an editing operation. An editing brush or wand represents an exemplary editing tool. The property distributions from each region are analyzed to identify different edit classes within the property space. The different edit classes are then used to apply an edit effect to the digital image within the tool impression (e.g., modifying hue property values of individual pixels). The edit classes may be represented by an edit profile in two or more dimensions (e.g., applying to one or more pixel properties).

In one implementation, an assisted adaptive editing tool receives classification guidance input that sets an edit profile characteristic for an automated editing operation. Given this setting of this first edit profile characteristic (e.g., an edit profile threshold or inflection point), other edit profile characteristics may be automatically computed based on the image content in the region being evaluated for editing.

Editing tool impressions may be grouped and then adaptively edited in aggregate. For example, the tool impression may be stroked across the image or multiple tool impressions may be selected before the adaptive editing operation is executed. Adaptive editing involves altering an editable property of a pixel and may include without limitation background erasure, red-eye correction, retouching, masking, surface normal processing, modifying image effects, blurring, sharpening, adjusting contrast, and labeling of image areas and features.

Figure 1:
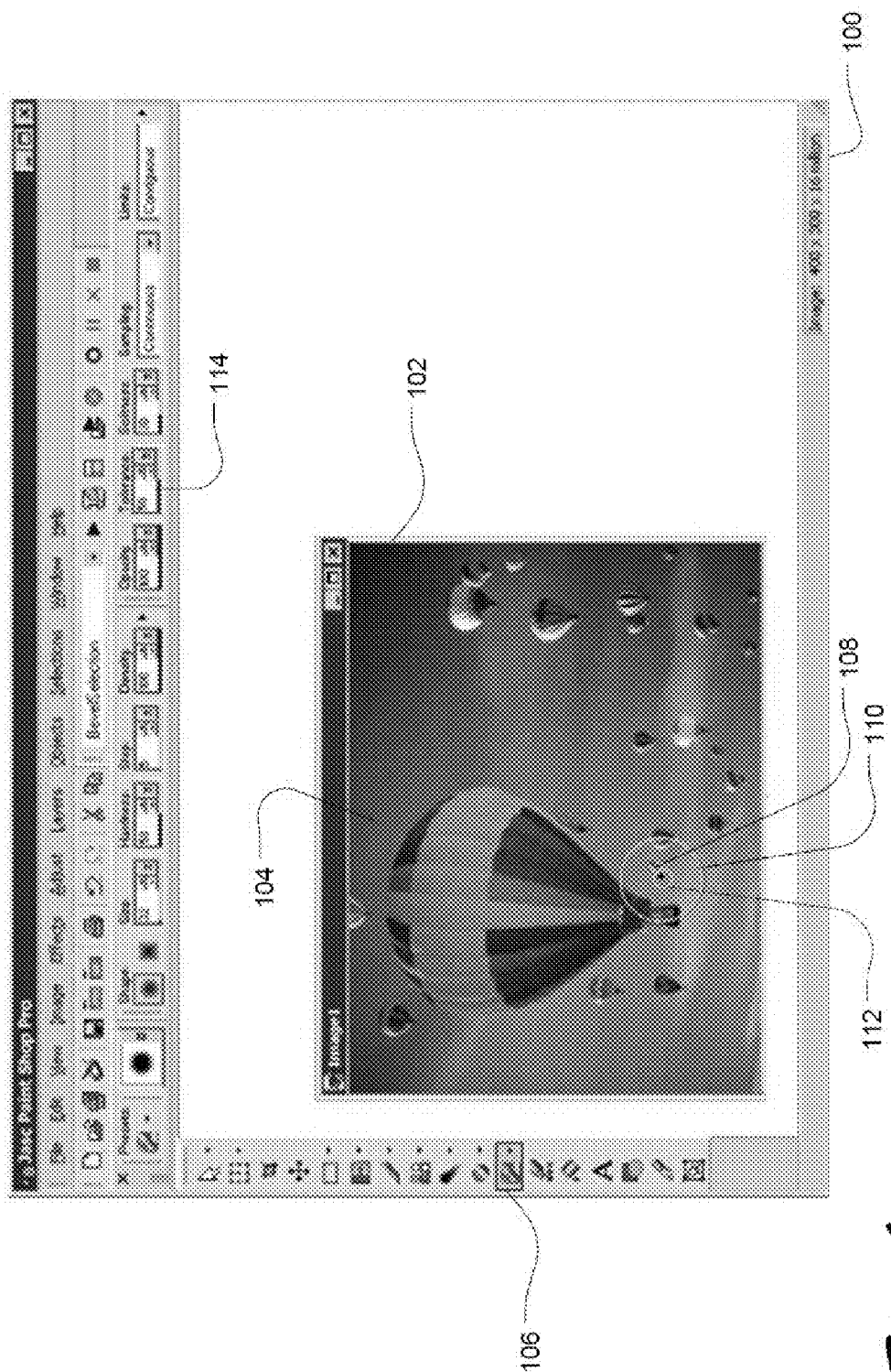
FIG. 1 illustrates a screenshot of an exemplary adaptive region editing tool.

FIG. 1 illustrates a screenshot 100 of an exemplary adaptive region editing tool. An image window 102 contains a display of a digital image 104. Selection of a background erasure tool button 106 initiates the exemplary adaptive region editing tool, designated by tool symbol 108. Operation of the exemplary tool is characterized by display of a tool impression 110 around the tool symbol 108 in the illustrated implementation. In one implementation, the tool impression 110 defines the portions of the digital image to be analyzed during an adaptive region editing operation. The tool impression 110 may also be manipulated by the user within the digital image display, such as by use of a keyboard, mouse, stylus, or other input device. Manipulation may include without limitation changes in location, size, and orientation.

In FIG. 1, the tool impression 110 is illustrated as a circular region, although other shapes may be employed, including without limitation square regions, rectangular regions, and adjustable regions. The illustrated tool impression 110 defines two component regions: a central region 112, and an outer region between the central region 112 and the outer boundary of the tool impression 110. Furthermore, in various implementations, the dotted line boundary of the central region 112 may or may not be visible to the user. In alternative implementations, tool impression regions and component regions of other shapes and orientation may be employed, including rectangular regions, triangular regions, regions of different shapes, adjacent regions (as opposed to concentric), overlapping regions, and non-adjacent regions. In addition, more than two regions may be employed.

In some implementations of an adaptive region editing tool, a tolerance parameter, shown in control 114, is not configurable. Instead, the tolerance parameter is automatically computed based on pixel property distributions detected within the tool impression region. However, in the illustrated implementation, the tolerance parameter is editable by the user. This user-configurable value allows the user to manually define an edit profile characteristic to influence an adaptive region editing operation.

For example, in the illustrated implementation, the user has specified a tolerance parameter equaling 50. Therefore, an edit profile characteristic is set to 50% of the color difference range between the minimum color difference detected under the tool impression and the maximum color difference detected under the tool impression. In one implementation, the edit profile characteristic may represent a boundary between a partial edit class and a no edit or unchanged class. In another implementation, the edit profile characteristic may represent a boundary between a full edit class and a partial edit class. Other characteristics discussed here may also be defined through such manual specification.

In alternative implementations, the size, shape, location, and orientation of the component regions or of the tool impression itself may be dependent on a user-setting or on image content found under the tool impression. For example, given a tool impression size setting (e.g., a BrushSize), a size of a central component region (e.g., having a SampleSize) may be set according to the following configuration (units in pixels):

If BrushSize<MinBrushThreshold then,
SampleSize=MinSampleSize
Else if MinBrushThreshold≦BrushSize≦MaxBrushThreshold then
SampleSize=BrushSize*ScalingFactor
Else if BrushSize>MaxBrushThreshold then
SampleSize=MaxSampleSize Alternatively, the BrushSize and/or SampleSize may be dynamically sized based on the values of pixel properties found in the tool impression. For example, the SampleSize may be automatically set by incrementally increasing the Sample Size until the width of a color difference distribution in the central region increases beyond a given threshold width, which would suggest that the central region has grown to include a portion of the object's color. Other approaches for dynamically adapting the size, shape, and orientation of the component regions based on image content are also contemplated.

The multiple tool impression regions allow a user to provide intelligent guidance for the selection of how and whether an individual pixel is edited. For example, as discussed, a user may wish to erase the background of an image, leaving the human subject (i.e., the foreground object) unchanged. In the illustration of FIG. 1, the tool impression 110 is placed in the digital image 104 so as to erase the pixels comprising the sky while leaving the pixels comprising balloon and basket relatively unchanged. Accordingly, the user can communicate guidance for this selection to the tool by including in the central region 112 only colors to be erased and including in the outer region some portion of object colors. Given this region-based information, the tool can then discern through classification which pixels to edit and how to edit them.

Examples of editing may include without limitation modifying image-related pixel properties, such as color, transparency, etc., but may also include modifying existing non-image-related pixel properties or adding additional properties (e.g., labels or properties applied to certain areas of the digital image). Various pixel properties and color spaces may also be employed, singly or in combination, in other implementations, including CMYK, Lab, and other color space values, transparency, brightness, hue, saturation. Furthermore, non-image pixel properties are also suitable, including a membership associated with a pixel, a feature vector (e.g., a texture descriptor or a color histogram of an image region), a height map, a depth map in a scene, a displacement vector, etc.

It should also be understood that different color spaces may be used for the individual adaptive editing sub-operations, including determining component region characteristics, determining an edit profile, performing the edit, and generating display characteristics. For example, the edit profile may perform a "selective restoration" action in which a previously executed editing operation is selectively "undone" (e.g., by performing a generally opposite editing action) according to the edit profile. In this manner, aspects of the image region may be selectively restored to a previous state (e.g., by selectively undoing a previously executed fill operation).

In the illustrated implementation, the appearance of a pixel is characterized by at least four values: three color channel values (red, blue, and green or RGB) and an opacity (or conversely, transparency) channel value, which defines the opacity of the pixel. The color channel values may be combined in a variety of ways to represent a single color selected from a given color space. The opacity channel value represents a degree by which an object obscures another object beneath it. For example, an object with 100% opacity completely conceals an object beneath it. In contrast, an object with 0% opacity is completely transparent and allows an object beneath it to be totally unobscured. An object with an opacity value between 0% and 100% is partially transparent. Specifically, the opacity of an object is defined by the opacity of the individual pixels that comprise it. (In FIG. 2, the checkerboard pattern visible in the image represents a region of pixels exhibiting some level of transparency.)

Accordingly, the exemplary adaptive editing tool of FIG. 1 samples pixel properties within each of the component regions of its tool impression to determine pixel property distributions within each component region. For example, in the illustrated tool example, the colors of each pixel (or of some subset of individual pixels) within the central region 112 are identified. In addition, the colors of pixels within the outer region are sampled. From these pixel color samples, the tool computes pixel color distributions associated with each region. It should be understood that property distributions may be quantized to any chosen degree and may represent, without limitation, frequencies of pixels having given property values, an integration of such frequencies, or some other mathematical derivation of the property frequencies. In addition, in some implementations, property distributions may be represented by histograms or hierarchies.

Sampling a pixel generally refers to the process of reading a pixel property for the purpose of analysis or classification. Furthermore, a pixel property may include an overall image, object, or region property that is associated with a given pixel (e.g., an object label). Sampling may also be performed on all pixels in a given region or on a representative fraction of the pixels in the region, which may be considered sparse sampling.

Given the pixel property distributions of the multiple component regions in the tool impression, the tool determines edit classes in the pixel property space (e.g., the color space, transparency, texture, layer, etc.) to which an editing effect may be assigned. For example, edit classes may be specified as: (1) an Erasure Class—a class of colors to be completely erased; (2) a Partial Erasure Class—a class of colors to be partially erased; and (3) an Unchanged Class—a class of colors to be left unchanged. However, in alternative implementations, it should be understood that any number of classes and editing effects may be controlled by the edit profile.

In the illustrated example, each pixel within the tool impression 110 is classified into one or more defined edit classes based on the pixel property value associated with the pixel. In some implementations, the defined edit classes may model classified pixel property distributions within a tool impression or may be derived from such classified pixel property distributions (e.g., computed based on a mathematical transform of the distributions). In one implementation, the editing effects are assigned to individual edit classes by way of an edit profile, as discussed with regard to FIG. 4. In alternative implementations, multiple editing effects may also be combined in more than one edit class (e.g., as a result of overlapping edit classes), or edit classes and membership therein may be determined by a probability function, so as to provide somewhat fuzzy or non-discrete edit class boundaries in the property space.

Accordingly, an edit profile may be used to apply one edit effect to one edit class of pixels within the image and a different edit effect to another edit class of pixels. In contrast, multiple edit effects for multiple edit classes are also contemplated. An edit effect may modify one pixel property of one edit class and the same or different pixel property of a second edit class. The pixel property being modified may be the same as or different from that used to segregate pixels into edit classes. The transition between different edit effects may be abrupt or gradual, with some pixels receiving an intermediate effect. Pixels receiving an intermediate effect may be of a separate edit class or may represent regions of overlap of class probability or class membership. The edit profile may determine an effect to be applied in absolute terms, for instance by prescribing a new value for a pixel property to replace the old, such that the new value (i.e., a replacement value) depends solely on the profile. The edit profile may also designate values of a new pixel property not previously associated with pixels within the image. Alternatively, the edit profile may represent a mathematical transformation between old and new property values of a pixel, such that the resulting image property depends both on the edit profile and on the original pixel property value. For instance, the edit profile may represent an adjustment for an existing image property. More complex transformations are also contemplated wherein the new pixel property is expressed as a parameterized function of the original property with parameter values determined by the value of the edit profile.

In the illustrated example, erasure may be accomplished by setting the opacity channel values of pixels within the tool impression 110 having color values within the erasure class to 0% opacity, setting the opacity channel values of pixels within the tool impression 110 having color values within the partial erasure class to some value between 0% and 100%, and setting the opacity channel values of pixels within the tool impression 110 having color values within the unchanged class to 100% opacity. (In one implementation, the opacity channel value of each pixel is scaled, not merely set, between 0% and 100% original opacity of the pixel in accordance with the edit profile, in order to accommodate pixels already having a non-zero opacity.) As previously noted, erasure is only one example of the type of editing that may be selectively performed using implementations described herein. In particular, color editing is contemplated.

Figure 2:
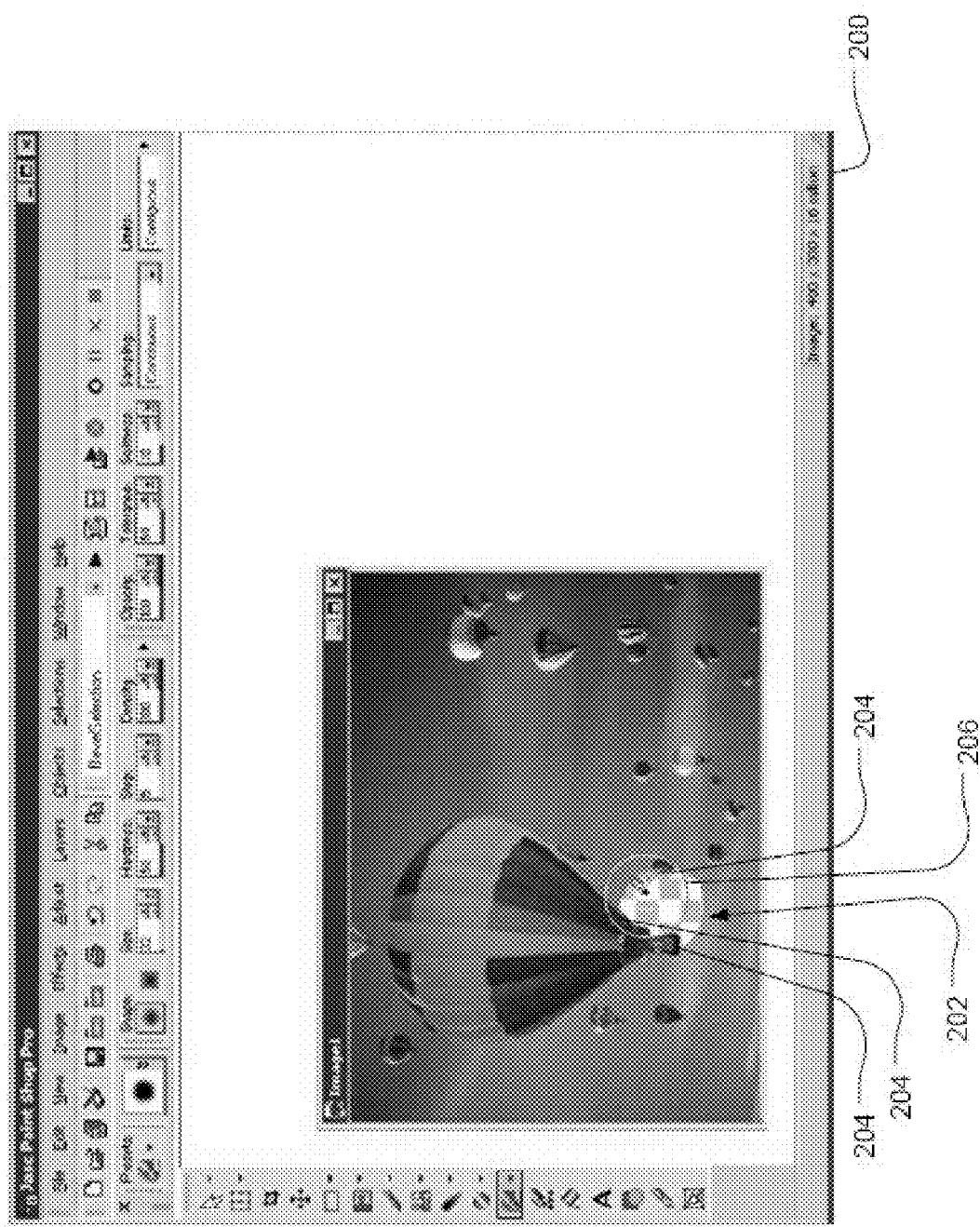
FIG. 2 illustrates another screenshot of an exemplary adaptive region editing tool.

FIG. 2 illustrates another screenshot 200 of an exemplary adaptive region editing tool. Two tool impressions have been selected in sequence. The first tool impression (shown at image area 202) resulted in selective erasure of the area of sky while leaving the balloons and baskets at 204 relatively unchanged. A second tool impression is shown at 206 prior to the associated editing operation. In one implementation, a new edit profile is defined for each instance of a tool impression so as to provide one type of adaptive feature to the editing operation—the edit profile adapts to the image content under each tool impression.

Figure 3:
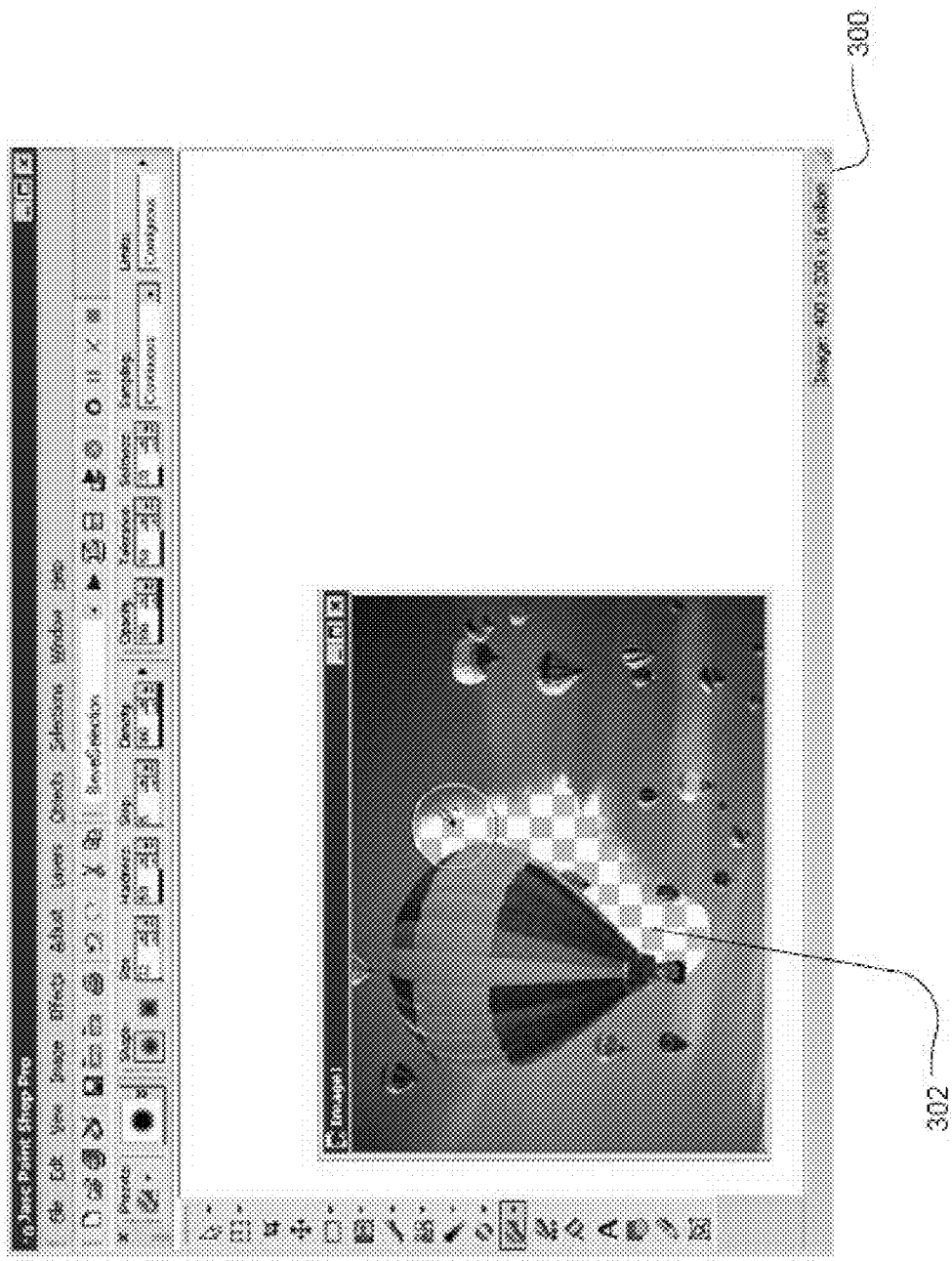
FIG. 3 illustrates yet another screenshot of an exemplary adaptive region editing tool.

FIG. 3 illustrates yet another screenshot 300 of an exemplary adaptive region editing tool. Multiple tool impressions have been selected and edited in sequence to leave the erased (i.e., checker-boarded) area 302. The illustrated digital image has a single layer. Thus, no image data is displayed in the erased area 302.

Individual controls and parameters of the adaptive tool illustrated in FIG. 3 are described below:

Presets: specific combinations of the other brush settings that may be saved and retrieved for convenience Brush tips: grayscale bitmaps acting as masks for the brush and determining which portion of the tip will have an effect and to what degree. Where the bitmap is black, the brush exerts a full effect, where it is white no effect, and where it is grey an intermediate effect.

Brush shapes: brush tip shape definitions based on a computed shape rather than a bitmap mask. The basic shapes are round or square and can be further modified by other controls.

Size: the size of brush in pixels. For irregularly-shaped brushes, the size is the bounding box of the shape. For round brushes, it is the diameter and for square brushes the length of a side.

Hardness: the degree to which the effect of the brush is scaled outwards from the center of the brush. At maximum Hardness, the brush has the same magnitude of effect everywhere under the brush (subject to masking due to loading a Brush Tip). As Hardness is decreased, the maximal effect of the brush is more and more confined to the center of the brush and decreases progressively outwards.

Step: intervals for designating individual tool impressions in a brush path or stroke. As the brush is moved along a path or stroke, it puts down tool impressions at intervals determined by the Step. A Step of 100 corresponds to moving the brush a distance equal to 100% of its Size. Smaller values put down more frequent impressions and larger values less frequent impressions.

Density: the fraction of randomly selected pixels under the brush to which the brush effect will be applied. At the maximum Density of 100 all pixels under the brush are affected (subject to masking due to loading a Brush Tip); otherwise not all of the pixels are affected, with fewer being affected the lower the density setting.

Thickness: a deformation of a round or square brush to, respectively, an ellipse or rectangle. The shape is symmetrical at a Thickness of 100 and increasingly unsymmetrical as the Thickness is reduced.

Rotation: the degree to which the brush tip is rotated relative to the horizontal or vertical axis of the image.

Opacity: a measure of uniformly scaling applied to the effect of the brush. After the geometric scaling due to a Brush Tip mask and the Hardness and Density settings are completed, the overall resultant effect of the brush is scaled by the Opacity. At an Opacity of 100 the brush produces the full result, while at lower values it has progressively less effect.

The following additional controls are specific to an implementation of an adaptive background erasure tool:

Tolerance: a measure of how color differences in the image are converted into differing levels of transparency. This control can either be set manually or simply shows the automatically computed Tolerance parameter when the Auto (adaptive) Tolerance checkbox is enabled.

Sharpness: a measure defining how object edges are treated. At high Sharpness values the brush will produce sharp edges on objects, corresponding to an abrupt transition in Alpha from background to object. High settings can be useful for differentiating an object from a background of almost identical color. Low Sharpness values will produce a wide semi-transparent edge with a distinct gradient in Alpha. Low settings can be useful for defining objects blurred by motion.

Sampling: a designation of how the image is sampled to determine the background color, with the following choices. Continuous means that a new determination of background color is made at every brush impression. Once means that the background color is sampled only at the initial impression that starts a brush stroke. This can be used when the background is uniform and allows the center of the brush to subsequently pass over the object without ill effect.

Limits: a setting that places some constraints on the assignment of Alpha, which are described more fully in the next section. Briefly, the Discontiguous mode has no constraints, Contiguous requires Alpha to be non-decreasing outwards from the center of the brush. Find Edges uses edge information in Alpha assignment.

Sample Merged: a control of brush behavior for an image comprising multiple layers. When unchecked only the image data on the current layer are sampled. Otherwise, image data from all visible layers are used. This control may have no meaning when the image is not being sampled to determine the background color.

Ignore Lightness: When checked the lightness component of color is not considered when estimating color similarity. Instead only chrominance information is used. This can be useful when object and background differ significantly in the saturation or vividness of color.

Limits: The illustrated brush also has a Limits setting with these choices: Discontiguous, Contiguous and Find Edges, which place additional constraints on how Alpha is assigned. Note that here the constraints primarily affect the assignment of Alpha outwards from the center of the brush (a "fill" operation) additionally to the assignment of Alpha based on image color (using a tolerance).

Discontiguous
  In the Discontiguous mode, the Alpha values of all the pixels under the brush tip outline are assigned.
Contiguous
  In the case of the Contiguous setting the assignment of Alpha values additionally depends on distance from the center of the brush as follows. Alpha is chosen to be a non-decreasing function outwards from the center of the brush towards the periphery of the brush.

Figure 4:
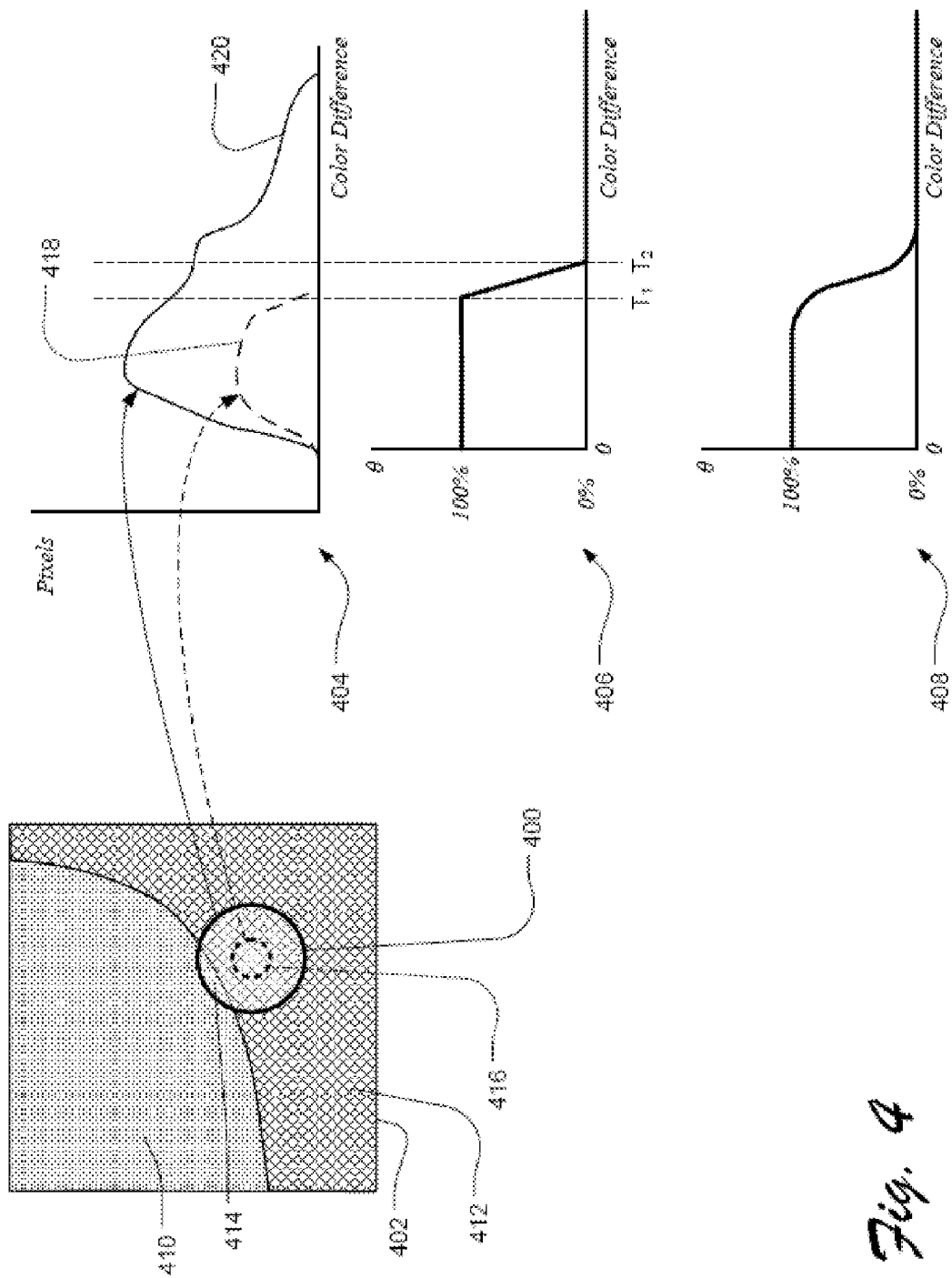
FIG. 4 illustrates exemplary relationships among a tool impression on a digital image, region property distributions, and two edit profiles.

FIG. 4 illustrates exemplary relationships among a tool impression 400 on a digital image 402, region property distributions 404, and two edit profiles 406 and 408. The digital image 402 includes an object 410 (representing a general class of pixels that are not to be edited) and a background 412 (representing a general class of pixels that are to be edited). Both the object 410 and background 412 may include multiple colors, textures, opacity values, etc. The adaptive region editing tool evaluates the pixel properties within the tool impression 400 to determine how to edit the pixels therein. In one implementation, the user places the tool impression 400 such that the outer region includes pixels of the object 410 (see region portion 414) and the central region 416 includes pixels of the background 412 but substantially none of pixels of the object 410 to guide the selective editing operation of the tool. In alternative implementations, the tool impression 400 need not include any portion of the object. For example, an adaptive retouch tool can selectively modify pixels corresponding to an edit class in the outer sampling region or selectively modify pixels corresponding to the edit class in the central sampling region, in each case the pixels in the remaining edit class(es) being substantially unchanged.

The properties of pixels within the central region 416 are sampled to produce a pixel property distribution 418, and the properties of pixels within the outer region are sampled to produce a pixel property distribution 420. In FIG. 4, the vertical axis of distributions 404 represents the number or fraction of pixels having a pixel property value or other pixel property-related value (e.g., a property difference value). The sampled property values are likely to be distributed throughout each region. For example, if the pixel property is color (or a color difference), it is reasonable to expect that the various pixels might exhibit some distribution of color throughout each region. It should be understood, however, that although this description of FIG. 4 relates to a single type of property (e.g., color) for each pixel, multiple properties may also be sampled to produce distributions of multiple properties for each pixel, such as values of multiple color channels, opacity, texture, etc. A given property, such as color, may have one or more dimensions. For example, color represented by an index into a color palette could be considered as one-dimensional because a single number—the palette index—is sufficient to define it. Alternatively, color defined by an RGB triplet of a pixel is three-dimensional, one dimension for each of red, green and blue. However, a pixel property may also be composite. For example, a given pixel may be associated with several numbers representing texture in some way and some values representing color. Therefore, a pixel property may represent at least: (1) a one-dimensional single property, (2) a multi-dimensional single property, or (3) a composite property.

In one implementation, a distribution of pixel properties of pixels in the central region is analyzed. An exemplary pixel property that may be employed in this analysis involves the color difference between the color of the pixel at the center of the central region 416 and the color of each other pixel in the central region 416. The background color CB (comprising of the color components RB, GB, and BB) is taken to be the color or the center pixel of the central region 416. The color CB may be used to establish the origin for the color difference axis and may be used for unblending pixels containing colors of both the object and the background. It should be understood that the color CB may also be computed using other algorithms, such as an average or median or mode color of pixels in the central region. (A vector median or mode returns some color that actually exists in the image.)

Differences in pixel properties, including multidimensional properties, may be computed in a variety of ways dictated by the nature of the intended editing operation. Distance Dist in p property space of dimension i may be expressed as a Minkowski sum or b norm:

$$Dist = \left[\sum_i (p_i - p_{i0})^b\right]^{1/b}$$

where $p_{i0}$ is a reference property value relative to which differences are computed. This reference property value may, for example, represent a background color. The exponent b may have a variety of integer or non-integer values (e.g., 1, 2, or 4). When b is 1, for a vector valued property $p_i$, such as color represented by R, G and B, Dist is equivalent to a simple sum:

$$Dist = (R-R_0)+(G-G_0)+(B-B_0)$$

For b=2, Dist is computed as the Euclidean distance:

$$Dist=\sqrt{(R-R_0)^2+(G-G_0)^2+(B-B_0)^2}$$

Distances may be computed with regard to sign, or using absolute values as in a Manhattan distance:

$$Dist=|R-R_0|+|G-G_0|+|B-B_0|$$

Distance calculations may also take into account property distributions (e.g., by means of a Mahalanobis distance). Furthermore, distances may be computed along individual property dimensions i, or subsets of these dimensions, and then combined into a single metric by mathematical transformation. For example, a minimum value may be selected:

$$Dist=MIN(|R-R_0|,|G-G_0|,|B-B_0|)$$

or a weighted combination value may be derived:

$$Dist=w_R(R-R_0)+w_G(G-G_0)+w_B(B-B_0)$$

wherein $w_i$ represents the weight for the contribution of a property or property dimension i. Additionally, one subset of property dimensions may be treated differently from another as in:

$$Dist=MAX(|R-R_0|,|G-G_0|)+|B-B_0|$$

Distances along individual dimensions may be combined into a single metric by rule, including the use of conditional rules as, for example, in:

$$Dist=MAX(|R-R_0|,|G-G_0|)+|B-B_0|$$

if $Sign(R-R_0)=Sign(G-G_0)\neq Sign(B-B_0)$ $$Dist=MAX(|G-G_0|,|B-B_0|)+|R-R_0|$$

if $Sign(G-G_0)=Sign(B-B_0)\neq Sign(R-R_0)$ $$Dist=MAX(|B-B_0|,|R-R_0|)+|G-G_0|$$

if $Sign(B-B_0)=Sign(R-R_0)\neq Sign(G-G_0)$

Depending on editing needs, it may be advantageous to form a metric from only a subset of pixel properties or only from a subset of pixel property dimensions. In one implementation pertaining to a prototypical vector pi in a property space of dimension i=4, a distance may be expressed for example as:

$$Dist=[(p_1-p_{10})^b+(p_3-p_{30})^b+(p_4-p_{40})^b]^{1/b}$$

Properties may also be transformed from one representation to another before computing a distance. For example, a color vector may be transformed to an opponent color representation such as L*a*b* or into an approximately opponent representation such as:

$$RGB=(R+G+B)/3$$

$$RG=(R-G+256)/2$$

$$BY=(2B-R-G+512)/4$$

After such a transformation either all or some of the properties or property components may be used to compute a property difference. For example, an approximately lightness-independent color difference may be estimated using:

$$Dist=|RG-RG_0|+|BY-BY_0|$$

or $$Dist=\sqrt{(RG-RG_0)^2+(BY-BY_0)^2}$$

It should be understood that when a distance is estimated for a composite pixel property, such as combination of color and texture, the form of the metric for each component property may be chosen independently and the metrics may be combined with different weights or by independent rules.

When using multidimensional property spaces, especially spaces of high dimension, it may be beneficial to include dimensionality reduction in the estimation of a distance in property space. Such dimensionality reduction may, for example, be achieved by employing only the leading or leading few principal components of the space. Alternatively, discriminant axes may be determined by a method such as linear or Fisher discriminant analysis. It is also possible to use principal component analysis in combination with discriminant analysis to discard insignificant property component vectors and then select a most discriminating vector from the remaining components. In yet another implementation, distributions may be fitted using mixture models, which may then be used to classify properties of the image.

A result of the described sampling operation in the central region is a pixel property distribution, such as is represented by distribution 418. Likewise, the outer region is also sampled to produce an outer region pixel property distribution 420. Other methods of determining pixel property distributions (e.g., color difference distributions) may be employed.

For an exemplary classification used in an adaptive background eraser, a three-dimensional color space has been converted into one-dimensional distance measurements. However, it is also possible to achieve this dimensionality reduction in other ways. First, dimensionality may be reduced by using only the leading principal components of the pixel colors under the tool impression. Secondly, one or more discriminant axes may be selected using, for example, linear discriminant analysis. The Principal Component Analysis step and the Linear Discriminant Analysis step can also be combined.

As seen in distributions 404, the distributions associated with the two regions (i.e., the central region 416 and the outer region of the tool impression 400) overlap considerably. In the illustrated example, this is to be expected in that the outer region includes a large area that contains background pixels. However, other distribution combinations are also possible, including combinations in which the central and outer region do not overlap, combinations in which multiple modes exist (whether the distributions overlap or not), etc. A variety of distributions are shown in examples in later Figures.

Accordingly, a feature of the exemplary tool is to take advantage of the user's placement of the tool impression regions to discern an edit profile based on the property distributions within the two differently located regions. In one implementation, it is assumed that the property distribution of pixels in the central region 416 represents the properties that are to be edited. It is also assumed that the property distribution of pixels in the outer region includes some properties that are not to be edited. These two assumptions facilitate the classification of properties values into distinct edit classes. It should be understood, however, that the editing may be in the inverse sense.

In one implementation, the edit profile is determined through classification of the property distributions to identify properties in different edit classes. In an example of an adaptive background erasure tool, Alpha (or "transparency") values may be derived according to a measure of similarity between the color of a pixel under the brush and an estimate of the background color under the brush. Pixels having colors that are very similar are fully erased (set to 100% transparency), whereas pixels having colors that are very different are not erased (no change to the transparency of the pixels). Intermediate color differences result in a partial erasure by changing the transparency of a pixel to some intermediate Alpha value—the greater the color difference, the greater the change in the intermediate Alpha value.

As shown in the edit profile 406, the pixel property range from the origin to parameter $T_1$ represents a first edit class (in this example, generally representing the background), the range between parameter $T_1$ and parameter $T_2$ represents a second edit class (in this example, generally representing a probable mix of background and object), and the range greater than parameter $T_2$ represents a third edit class (in this example, generally representing the object).

In computing the piece-wise linear example of edit profile 406, parameters characterizing the two pixel property distributions are computed. In one implementation, the mean color difference of the background distribution, $Mean_B$ and the variance of the background distribution, $Var_B$, are computed for determining the minimum tolerance parameter $T_1$. When $Var_B/Mean_B$ exceeds a threshold $Thresh_B$, $T_1$ may be computed as:

$$T_1 = k \times \sqrt{Var_B}$$

where k is a constant inversely proportional to the Sharpness setting. If threshold $Thresh_B$ is not exceeded, the sampling region may be iteratively expanded by a one-pixel wide contour about its periphery until this threshold is reached. Then $T_1$ may be estimated as before or as:

$$T_1 = k \times Integ$$

where Integ is the color difference at a fixed fraction of the integral of the difference distribution, such as 90% for instance.

Once the minimum tolerance parameter $T_1$ is computed based on the pixel property distribution in the central region 416 of the tool impression 400, the pixel properties under the outer region of the tool impression 400 are analyzed to determine the maximum tolerance parameter $T_2$. The pixels within this region are characterized by an unknown combination of pixel properties (e.g., of object and background colors). The pixel property distribution 420 for this region is filtered to exclude all pixels having pixel properties below the minimum tolerance parameter $T_1$. In one implementation, the mean color difference of the object distribution, $Mean_O$, and the variance of the object distribution, $Var_O$, are computed for determining the maximum tolerance parameter $T_2$. Up to a predefined magnitude of k, $T_2$ may be taken as:

$$T_2 = k \times MIN(Mean_O, \sqrt{Var_O})$$

and above this magnitude as:

$$T_2 = k \times \sqrt{Var_O}$$

If $Var_B/Mean_B$ is less than the threshold $Thresh_B$, the value of $T_2$ may be adjusted as follows:

$$T_2 = T_1 + T_2$$

Additionally, when $Var_O/Mean_O$ is less than a threshold, $Thresh_O$, but $\sqrt{Var_O}$ exceeds a second threshold, $ThreshV_O$, the same adjustment may be performed. In general, $T_1$ and $T_2$ are constrained to represent non-null color difference ranges and to lie within their respective data ranges, and the value of $T_1$ is further constrained to be less than that of $T_2$.

Other types of classification may be employed to define editing classes. For example, more conservative values of thresholds may be used, i.e. a minimum tolerance $T_1$ and a maximum tolerance $T_2$ to define edit classes of colors that have a very high probability of belonging to the background and the object respectively. These two conservative edit classes may be used as training sets for a classifier that categorizes the remaining colors.

Alternatively, any of several probability density functions may be fitted to the pixel property distribution of the central sampling region. By subtraction of the extrapolated distribution of the color differences in the outer region of the brush, a better estimate of true object colors may be obtained to act as a training set. Suitable exemplary trial distributions include without limitation the normal, binomial, Poisson, gamma and Weibull distributions. Additional exemplary distributions may be found in the Probability distribution section of Wikipedia (http://en.wikipedia.org/wiki/Probability_distribution). Such distributions may also be used for classification using Bayesian statistics. Because of the projection of color differences onto a single axis, several distinct colors may have color differences falling in a single histogram bin. The original colors contributing to each bin can be identified in the three-dimensional color space and the training set member colors can be used for a classification of colors in three-dimensional space.

Exemplary methods for suitable for this classification are described in T.-S. Lim, W.-Y. Loh and Y.-S. Shih, "A Comparison of Prediction Accuracy, Complexity, and Training Time of Thirty-three Old and New Classification Algorithms", Machine Learning Journal, vol. 40, p. 203-229, 2000, and include categories such as decision tree approaches, rule-based classifiers, belief networks, neural networks, fuzzy & neuro-fuzzy systems, genetic algorithms, statistical classifiers, artificial intelligence systems and nearest neighbor methods. These techniques may employ methodologies such as principal component analysis, support vector machines, discriminant analysis, clustering, vector quantization, self-organizing networks and the like.

As an alternative to this form of classification, the color distributions of the central region and the outer region may be treated as two signals to be separated into background and object categories by the techniques of blind signal separation. Since the central region provides a background signal not significantly contaminated by object colors, this represents a more straightforward case of semi-blind signal recovery. An element of blind signal separation is the use of higher order statistical measures. Suitable methods for blind signal separation are described in J.-F. Cardoso, "Blind signal separation; statistical principles", Proc. IEEE, vol. 9(10), p. 2009-2025, 1998 and in A. Mansour, A. K. Barros and N. Ohnishi, "Blind Separation of Sources: Methods, Assumptions and Applications", IEICE Trans. Fundamentals, vol. E83-A, p. 1498-1512, 2000.

The edit profile relates an editing effect, designated θ, to the different edit classes. For example, in an erasure operation, the editing effect may represent a transparency value (i.e., the inverse of opacity). As such, edit profile 406 specifies a 100% transparency value for the edit class between 0 and parameter $T_1$, representing complete erasure of pixels having colors falling in this range. In contrast, the edit profile specifies an unchanged transparency value for the edit class greater than parameter $T_2$, representing no change to the pixels having colors falling in this range. For pixels having colors falling between parameter $T_1$ and parameter $T_2$, edit profile 406 specifies a linear scaling of the transparency effect (e.g., transparency change decreases with increasing color differences).

It should also be understood that although the edit profiles of FIG. 4 are shown to be based on a single pixel property distribution, edit profiles may also be generated for multiple pixel properties and therefore are not limited to two dimensions. See FIG. 7 as an example of three dimensional edit profile applied to two pixel properties.

In alternative implementations, an edit profile need not be based on sharp thresholds, as shown by the sigmoidal edit profile 408, where a parameter can define a point of inflection or any other feature of an edit profile based on a pixel property. For example, the parameters $T_1$ and $T_2$ may be employed to define an edit profile that defines an Alpha value (i.e., defining transparency of a pixel) based on the tilde function:

$$\text{Alpha}=1-\exp\{-T_1[\ln(\text{DIFF}_{max}/\text{DIFF})]^{T2}\}$$

where DIFF represents the color difference of a pixel under the tool impression, $\text{DIFF}_{max}$ represents the maximum DIFF value of all pixels under the tool impression, and $T_1$ and $T_2$ are the parameters.

Sigmoidal functions may also be used, including without limitation the arctangent and the tangent functions, and an adaptation of the Weibull function, with the form:

$$\text{Alpha}=1-\exp[-(T_2/\text{DIFF})^{T_1}].$$

Other exemplary sigmoidal functions that may be adapted to define edit profiles are listed below:

$$\text{Alpha} = 1 - \left(\frac{2}{\left(1+e^{-\left(\frac{DIFF}{s}\right)}\right)} - 1\right) = \frac{2e^{-\left(\frac{DIFF}{s}\right)}}{\left(1+e^{-\left(\frac{DIFF}{s}\right)}\right)}.$$

$$\text{Alpha} = 1 - \frac{sDIFF}{\sqrt{1+s^2DIFF^2}}.$$

The parameter s defining these functions may be, for example, derived by centering the point of inflection between the parameters $T_1$ and $T_2$ and matching the slope of the line between the parameters $T_1$ and $T_2$.

Figure 5:
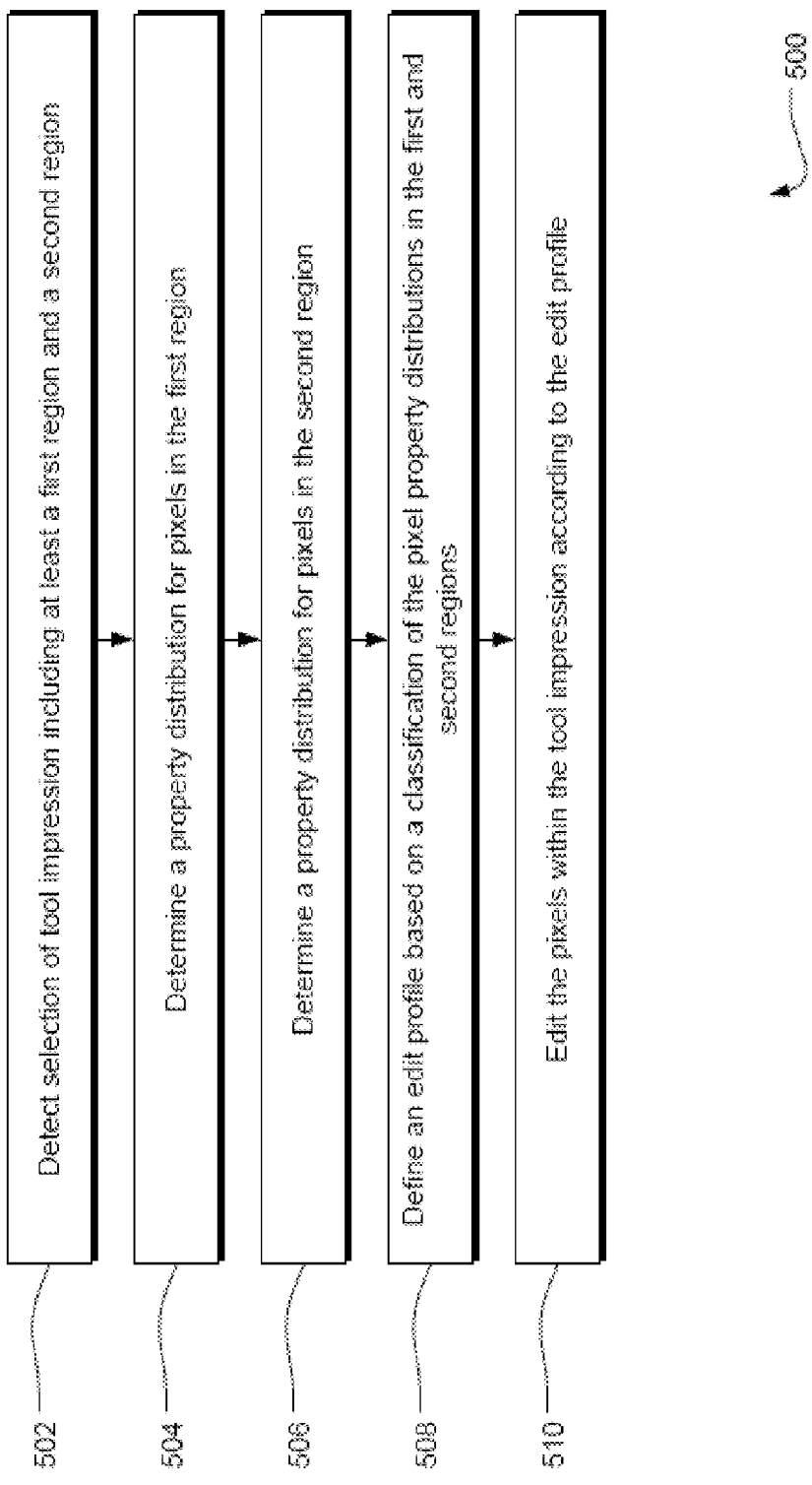
FIG. 5 illustrates exemplary operations for adaptive region editing.

FIG. 5 illustrates exemplary operations 500 for adaptive region editing. A detection operation 502 detects selection of a tool impression relative to a digital image. The selection defines at least a first region (e.g., a central region within the tool impression) and a second region (e.g., an outer region within the tool impression) within the tool impression. It should also be understood that FIG. 5 generally describes sequential processing for an individual tool impression, but that the same sequence of operations may be applied after selection of multiple tool impressions, such that an aggregate tool impression with an aggregate first region and an aggregate second region are processed.

Various configurations of tool impressions and subdivided regions thereof may be employed. In one implementation, the regions are differently-located subdivisions of the tool impression. For example, as shown in FIGS. 1-4, the regions may be concentric (e.g., central region and outer ring). Alternatively, other differently located subdivisions of the tool impression may be employed. For example, adjacent square regions may be useful for selectively editing square or rectangular features of a digital image. Likewise, the regions may even be non-adjacent or independent. For example, the first region may be placed in a static location in the background and the second region may be moved from location to location along the boundary of the object. Furthermore, more than two regions may also be employed as well as regions of differing shapes, sizes, and orientations.

A sampling operation 504 determines a property distribution for pixels within the first region. For example, for each pixel, a color difference value (e.g., relative to a reference color value) may be used as the pixel property. Another sampling operation 506 determines a property distribution for pixels within the second region. A classification operation 508 defines an edit profile based on the pixel property distributions within the first and second regions, which are located in somewhat different locations, at somewhat different orientations, and/or at somewhat different sizes and shapes. The classification operation 508 may also be aided by the assumption that one region contains some pixels that are not intended to be edited whereas the other region does not, or other contextual knowledge of the problem domain (e.g., red-eye correction).

The edit profile specifies the editing effects may be applied to pixels having properties in a given edit class. Accordingly, an editing operation 510 edits the pixels within the tool impression in accordance with the edit profile. For example, pixels in the erasure region may have their transparency values set to 100% while pixels in the partial erasure region may have their transparency values set to some value between 100% and 0% in accordance with the edit profile.

In one alternative implementation, different editing effects may be applied to pixels in different editing classes. For example, background pixels may be lightened while foreground or object pixels may be darkened, thereby adaptively adjusting contrast in the selected regions. In another example, existing opacity may be enhanced in an object region and reduced in a background region to provide adaptive adjustment of transparency contrast. An example of hue modification is show in FIG. 18.

Figure 6:
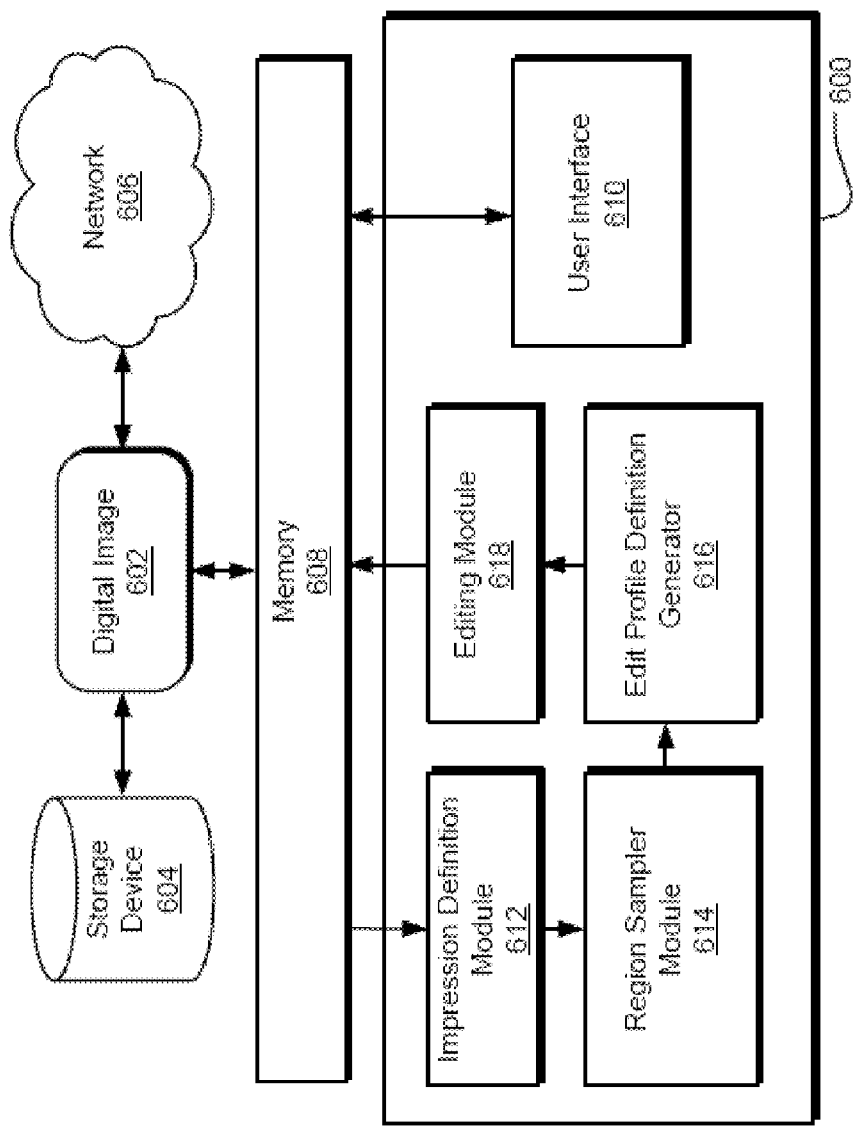
FIG. 6 illustrates an exemplary architecture of an assisted adaptive region editing tool.

FIG. 6 illustrates an exemplary architecture of an adaptive region editing tool 600. In various implementations, modules may be structured as hardware or as software executing within a computer system. A digital image 602 may be represented by encoded data, such as in JPEG format, GIF format, or some other standard or proprietary format. The digital image 602 may be received from a persistent storage medium 604 (e.g., a magnetic or optical storage disk, or flash memory) or from a communications network 606 (e.g., the Internet or a local area network). The digital image 602 is transferred to another storage medium, such as memory 608 for access by the editing tool 600.

A user interface 610 can access the digital image 602 from the memory 608 and display it to a user. For example, FIGS. 1-4 illustrate user interface screenshots of an exemplary adaptive region editing tool. The user interface 610 may also receive input from the user, relative to the digital image, instructing that assorted editing operations be performed on an area of the digital image 602 as well as parameters for such operations, such as the location and dimensions of the tool impression.

The input is received by an impression definition module 612, which accesses the memory resident representation of the digital image 602, and communicates the location and dimensions of the tool impressions as well as the two or more subdivisions (i.e., component regions) therein. The subdivisions are differently located within the tool impression and therefore have at least one pixel difference between them. In one implementation, this impression selection occurs for each tool impression, whereas in other implementations, this impression selection may be applied to multiple tool impressions (e.g., to multiple distinct tool impressions or to a stroke of the tool impression across the image, which is interpreted as multiple individual tool impressions). For such aggregate tool impressions, first and second component regions may be determined in a variety of ways. One example is that tool impression regions that overlap a sampling (e.g., background) component region of any tool impression in the set are considered sampling component regions while all other tool impression regions are considered foreground component regions.

A region sampler module 614 samples the properties of the pixels in each region to produce a property distribution for each region. An edit profile definition module 616 classifies the property distributions of the regions to determine a number of edit classes to which an editing effect is applied differently. Given the edit classes, an editing module 618 applies the edit classes to individual pixels within the tool impression. Therefore, using the region erasure example, pixels having property values falling into the erasure class have their transparency values set to 100%, pixels having properties values falling into the partial erasure class have their transparency values set to a tapered value between 100% and 0%, and pixels having properties values falling into the unchanged class have their transparency values unchanged. The editing changes are saved to memory, from which the user interface 610 can retrieve the updated digital image data and display the changes to the user.

Figure 7:
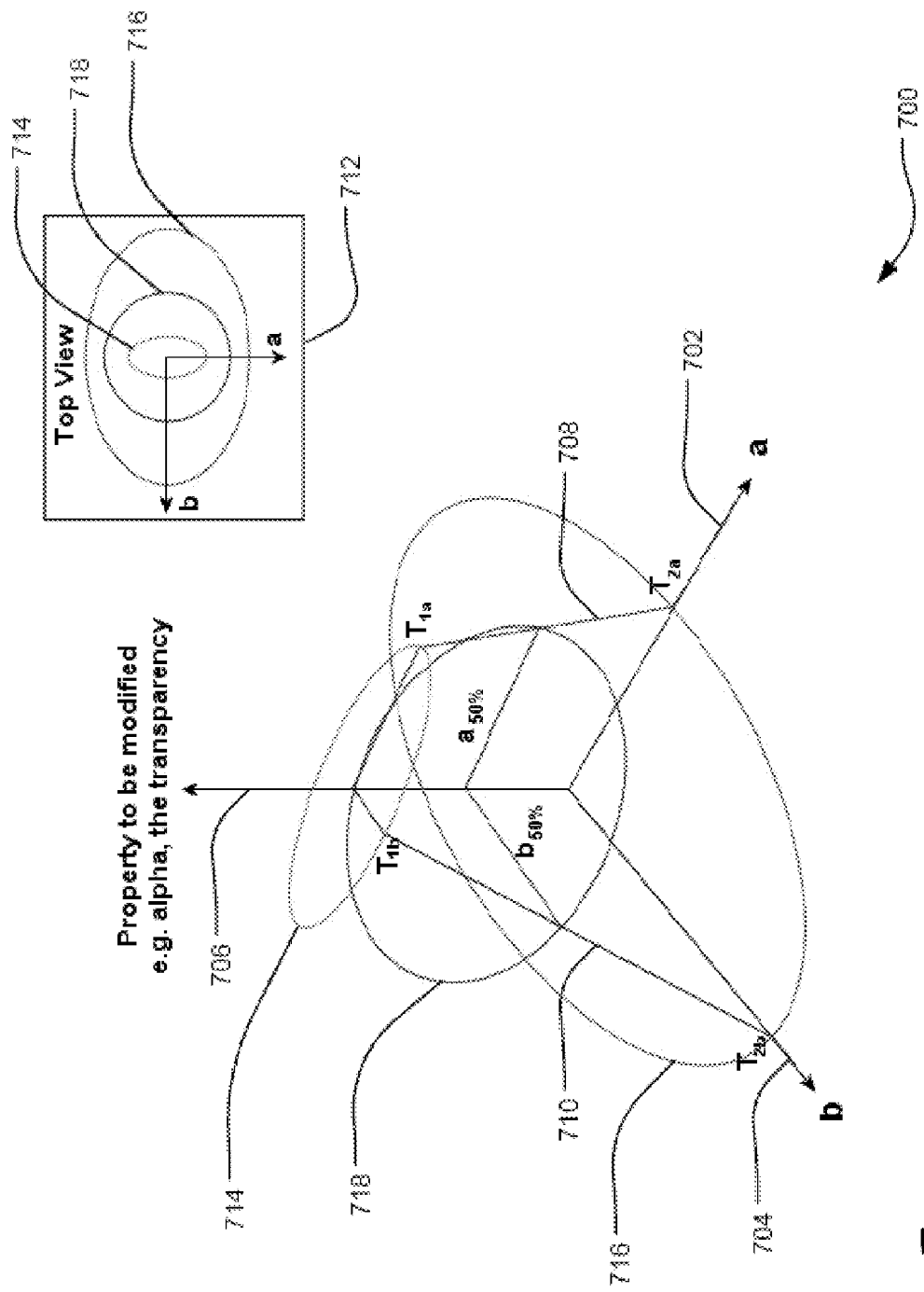
FIG. 7 illustrates an exemplary edit profile applied to two pixel properties.

FIG. 7 illustrates an exemplary edit profile 700 applied to two pixel properties a and b. In the edit profile 700, the pixel property a is shown along axis 702, the pixel property b is shown along axis 704, and the transparency editing effect is shown along axis 706. An edit profile component 708 applies to the pixel property a, and another edit profile component 710 applies to the pixel property b.

Combining the two edit profile components 708 and 710 results in a process of classifying the properties in two dimensions, as illustrated by the top view 712. The oval region between the origin and oval 714 represents the edit class of total erasure, such that pixels classified within the corresponding edit class have their transparencies set to 100%. The region between the oval 714 and the oval 716 represents the region of partial erasure, such that pixels classified within the corresponding edit class have their transparencies set to 100%. The region outside the oval 716 represents the region of no erasure, such that pixels classified within the corresponding edit class have their transparencies unchanged. The oval 718 represents the 50% point in the tapering of editing effect as applied to each property. It should be understood that other pixel properties, such as lightness, hue, or color, could be additionally or alternatively employed.

Figure 8:
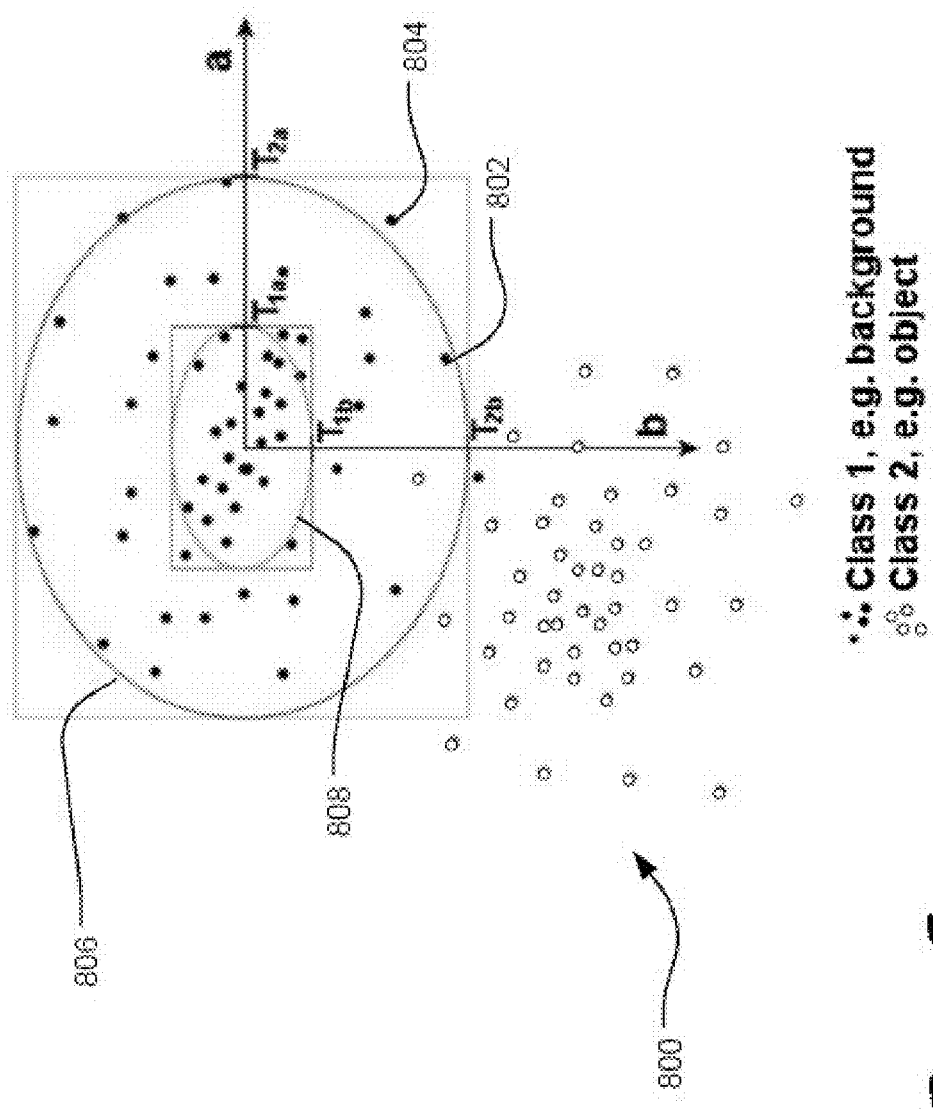
FIG. 8 illustrates exemplary classifications for distributions of multiple properties.

FIG. 8 illustrates exemplary classifications for distributions of multiple properties. The classification 800 shows data points for pixels based on their values of the properties a and b. For example, the data point 802 represents a pixel having positive values for a and b, where its location relative to the edit classes suggests that its transparency will be set slightly greater than 0%, whereas the pixel represented by data point 804 will have its transparency unchanged.

The classification 800 shows that most of the background pixels (illustrated with black dots) are classified as within the erasure class threshold 808 or the partial erasure class threshold 806; whereas most of the foreground (e.g., object) pixels are classified as outside the partial erasure class threshold 806.

Figure 9:
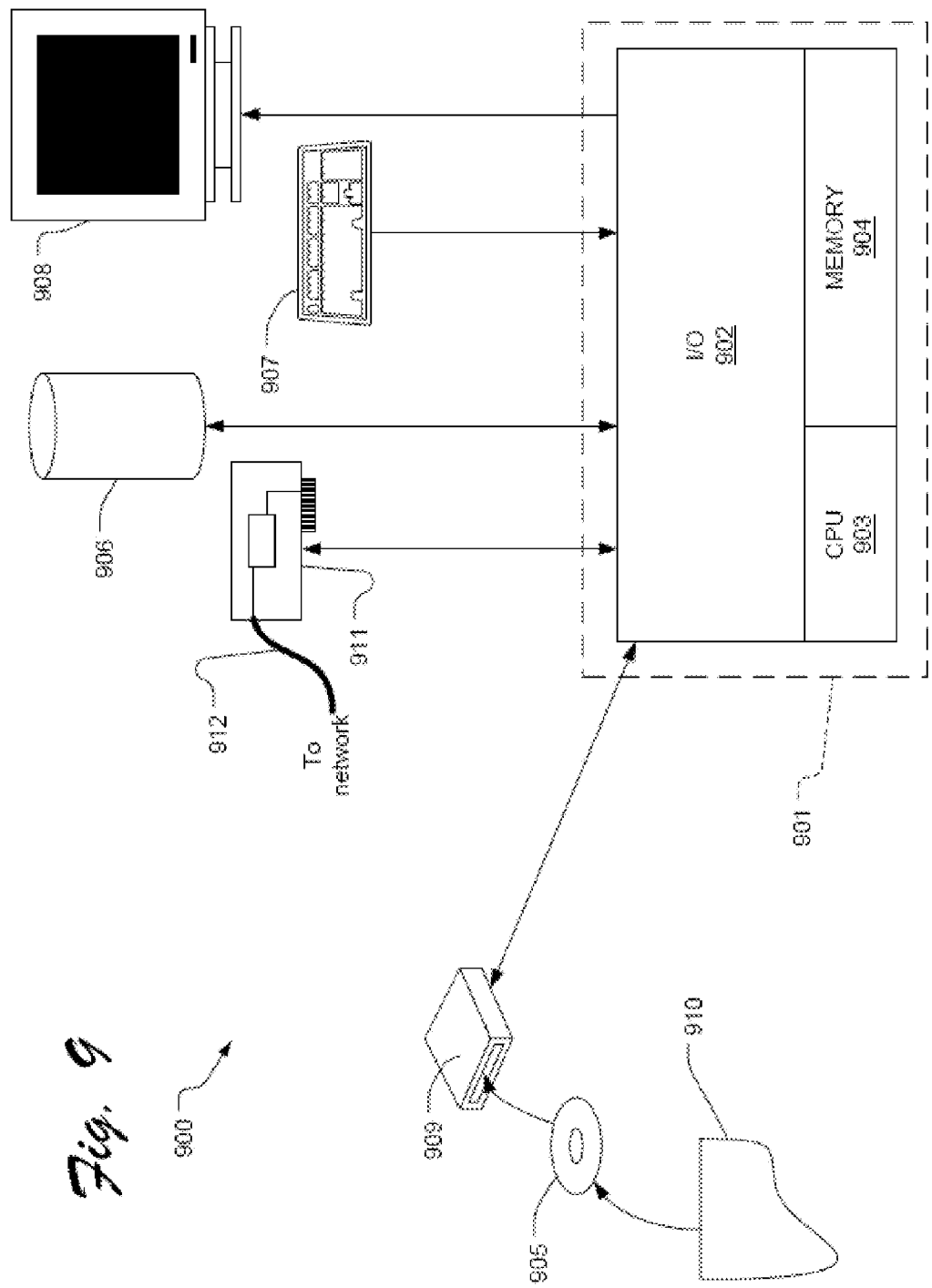
FIG. 9 illustrates an exemplary system useful for implementing an implementation of the present invention.

FIG. 9 depicts an exemplary general purpose computer capable of executing a program product. One operating environment in which the described system is potentially useful involves the general purpose computer, such as shown as computer 900. In such a system, data and program files may be input to the computer, including without limitation by means of a removable or non-removable storage medium or a data signal propagated on a carrier wave (e.g., data packets over a communication network). The computer 900 may be a conventional computer, a distributed computer, or any other type of computing device.

The computer 90 can read data and program files, and execute the programs and access the data stored in the files. Some of the elements of an exemplary general purpose computer are shown in FIG. 9, wherein a processor 901 is shown having an input/output (I/O) section 902, at least one processing unit 903 (e.g., a microprocessor or microcontroller), and a memory section 904. The memory section 904 may also be referred to as simply the memory, and may include without limitation read only memory (ROM) and random access memory (RAM).

A basic input/output system (BIOS), containing the basic routines that help to transfer information between elements within the computer 900, such as during start-up, is stored in memory 904. The described computer program product may optionally be implemented in software modules loaded in memory 904, hardware modules, or firmware and/or stored on a configured CD-ROM 905 or storage unit 909, thereby transforming the computer system in FIG. 9 to a special purpose machine for implementing the described system.

The I/O section 902 is connected to keyboard 907, display unit 908, disk storage unit 909, and disk drive unit 906, typically by means of a system or peripheral bus (not shown). The system bus may be any of several types of bus structures including a memory bus or memory controller, a peripheral bus, and a local bus using any of a variety of bus architectures.

Generally, in contemporary systems, the disk drive unit 906 is a CD-ROM drive unit capable of reading the CD-ROM medium 905, which typically contains programs and data 910. Computer program products containing mechanisms to effectuate the systems and methods in accordance with the present invention may reside in the memory section 904, on a disk storage unit 909, or on the CD-ROM medium 905 of such a system. Alternatively, disk drive unit 909 may be replaced or supplemented by a floppy drive unit, a tape drive unit, or other storage medium drive unit. The network adapter 911 is capable of connecting the computer system to a network via the network link 912.

The drives and their associated computer-readable media provide nonvolatile storage of computer-readable instructions, data structures, program modules and other data for the computer 900. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

The computer 900 may operate in a networked environment using logical connections to one or more remote computers. These logical connections are achieved by a communication device 911 (e.g., such as a network adapter or modem) coupled to or incorporated as a part of the computer 900; the described system is not limited to a particular type of communications device. Exemplary logical connections include without limitation a local-area network (LAN) and a wide-area network (WAN). Such networking environments are commonplace in office networks, enterprise-wide computer networks, intranets and the Internet, which are all exemplary types of networks.

In an exemplary implementation, an impression definition module, a region sampler module, an edit profile definition generator, and an editing module may be incorporated as part of the operating system, application programs, or other program modules executed by the CPU 903. The digital image, the property distributions, thresholds, edit profiles, and edit classes may be stored as program data in memory section 904, on a disk storage unit 909, or on the CD-ROM medium 905.

Figure 10:
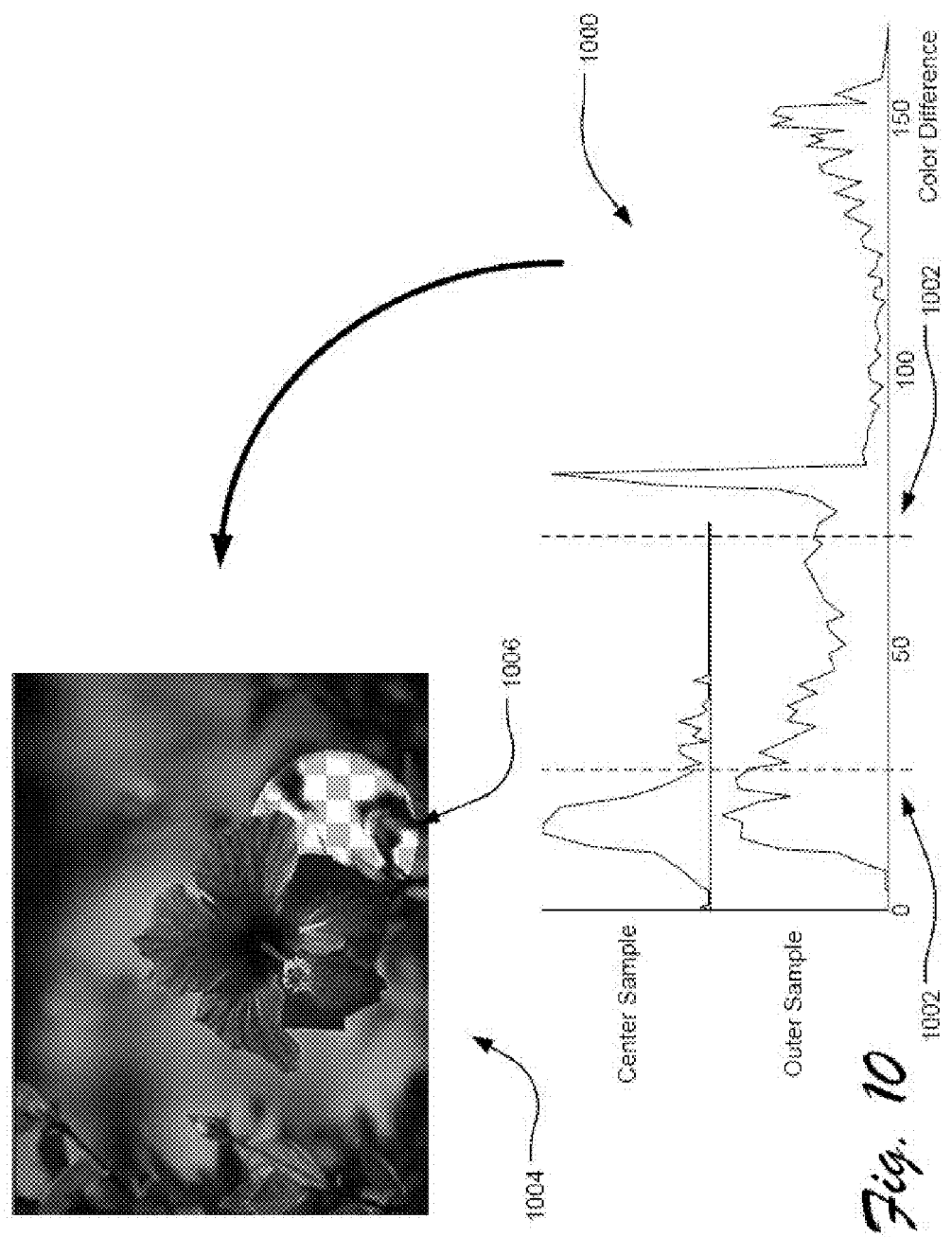
FIG. 10 illustrates exemplary pixel property distributions and edit profile parameters relative to an example image and tool impression.

FIG. 10 illustrates exemplary pixel property distributions 1000 and edit profile parameters 1002 relative to an example image 1004 and tool impression 1006.

Figure 11:
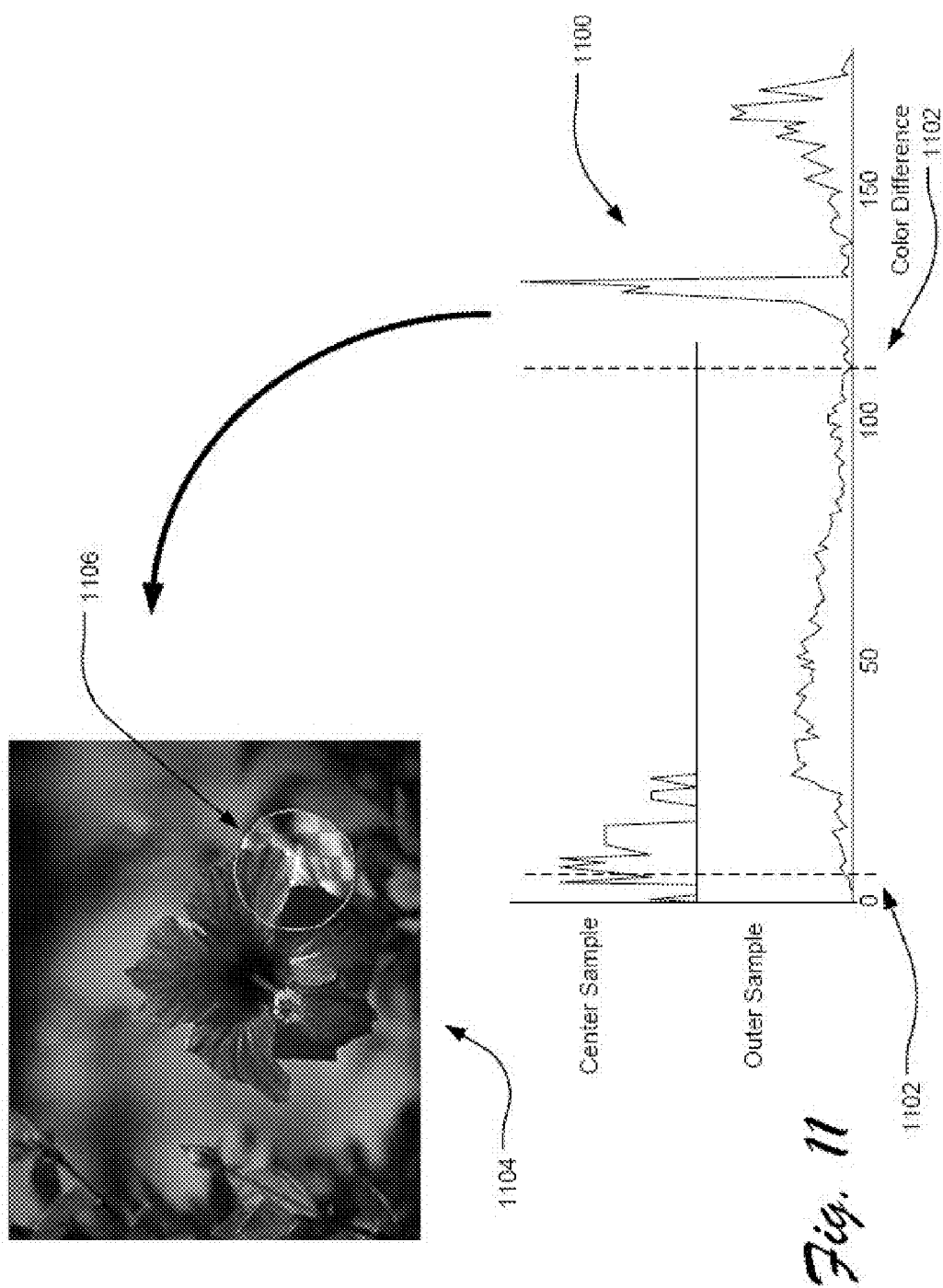
FIG. 11 illustrates other exemplary pixel property distributions and edit profile parameters relative to an example image and tool impression.

FIG. 11 illustrates other exemplary pixel property distributions 1100 and edit profile parameters 1102 relative to an example image 1104 and tool impression 1106.

Figure 12:
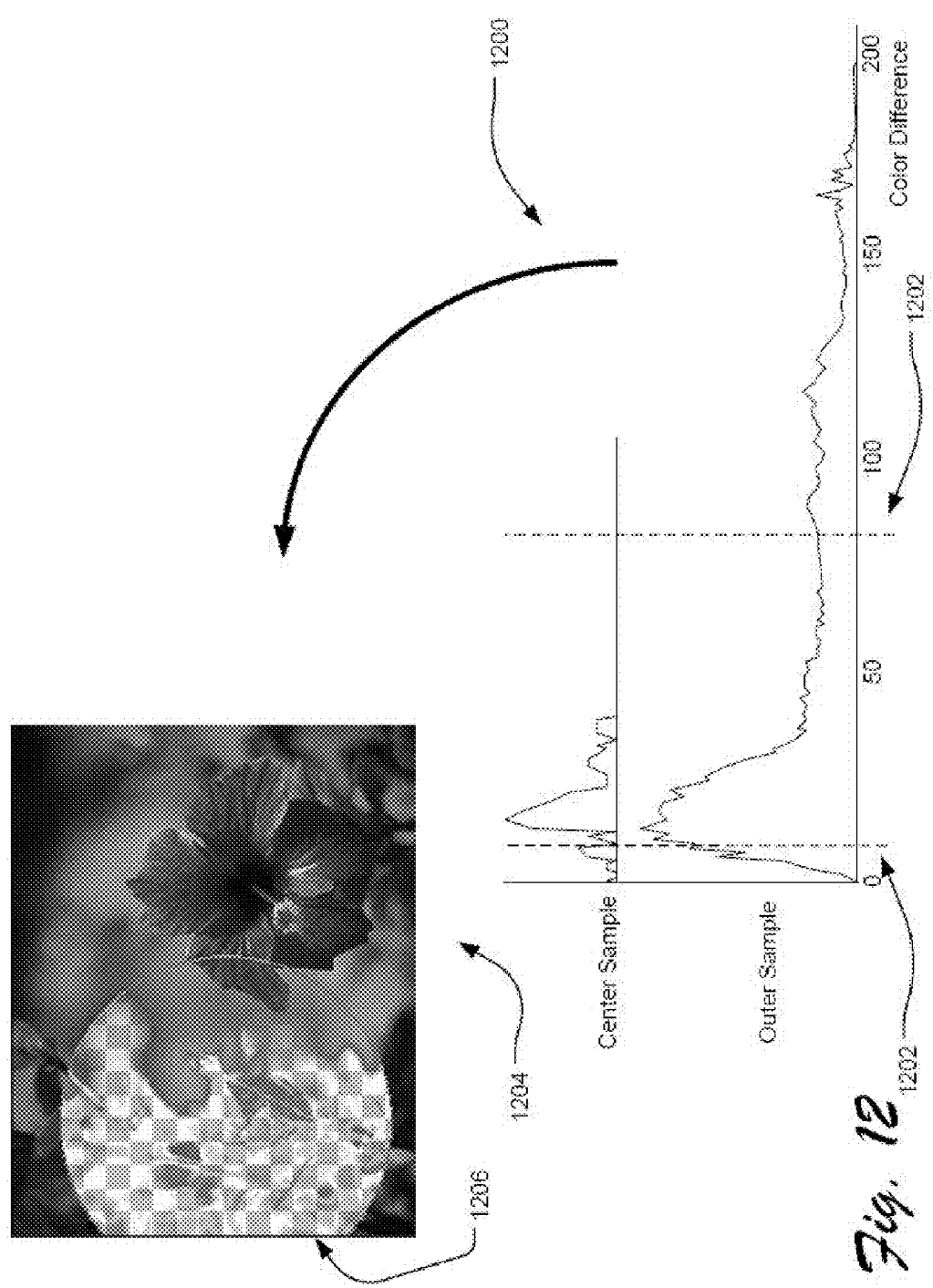
FIG. 12 illustrates other exemplary pixel property distributions and edit profile parameters relative to an example image and tool impression.

FIG. 12 illustrates other exemplary pixel property distributions 1200 and edit profile parameters 1202 relative to an example image 1204 and tool impression 1206.

Figure 13:
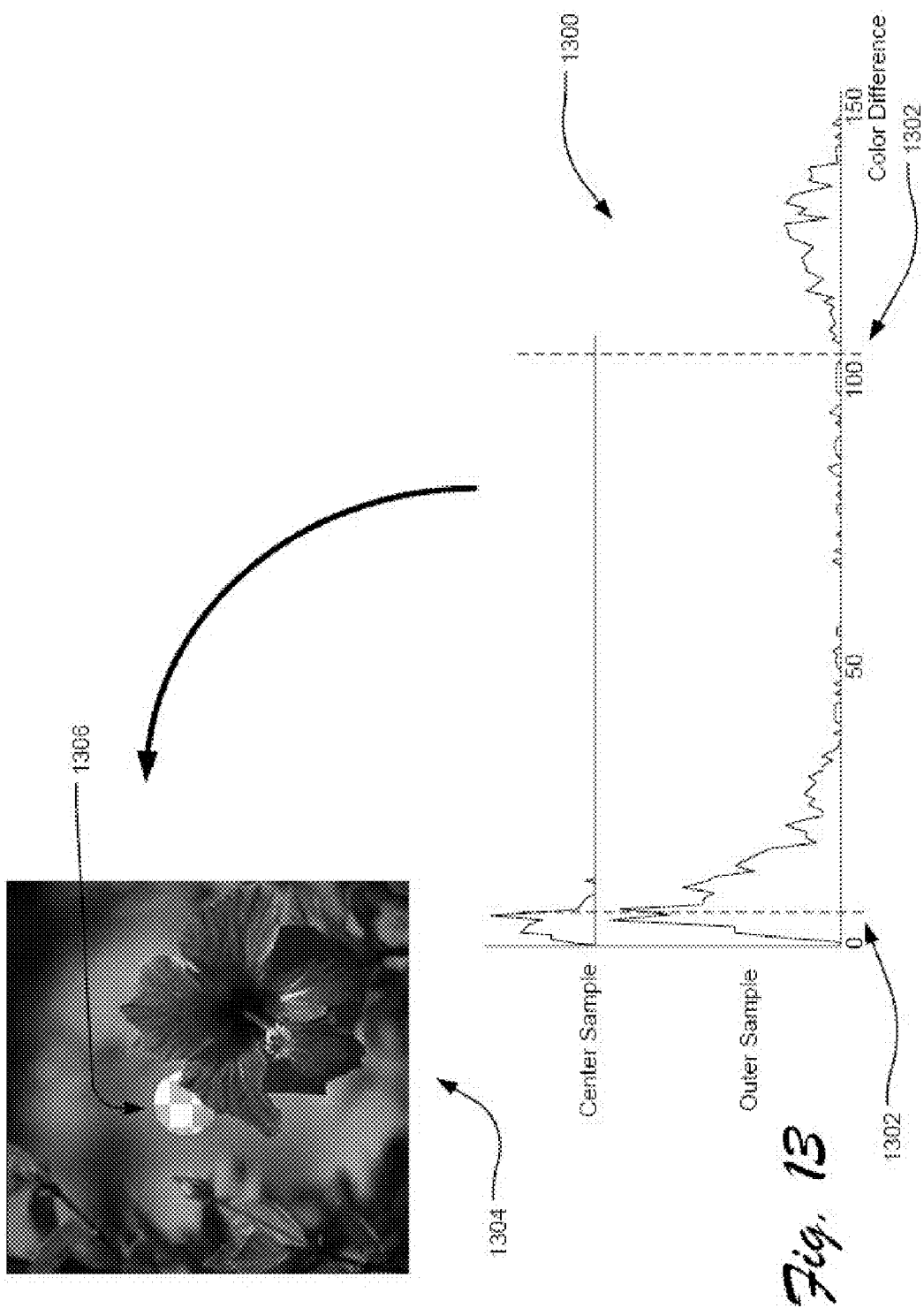
FIG. 13 illustrates other exemplary pixel property distributions and edit profile parameters relative to an example image and tool impression.

FIG. 13 illustrates other exemplary pixel property distributions 1300 and edit profile parameters 1302 relative to an example image 1304 and tool impression 1306.

Figure 14:
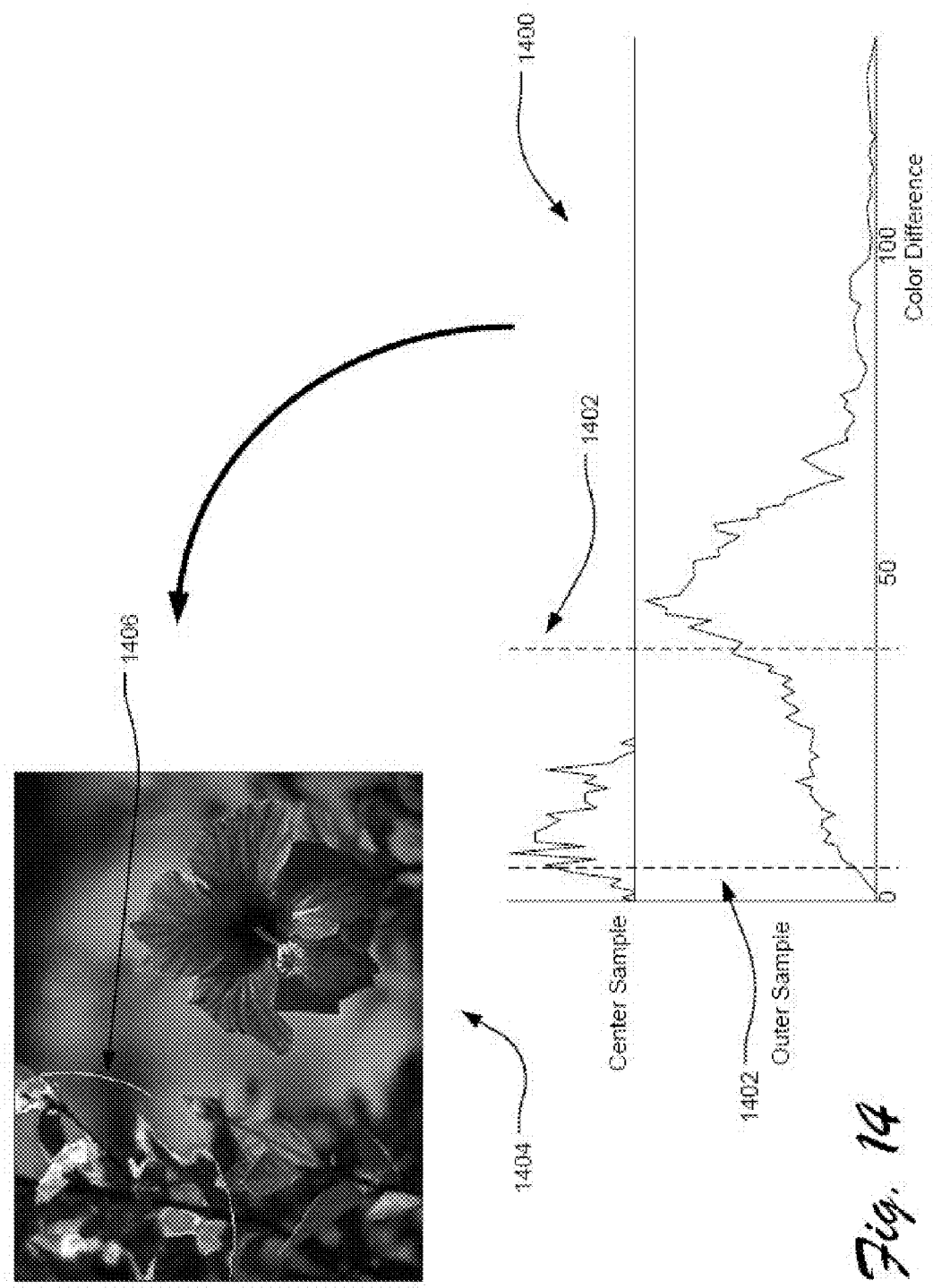
FIG. 14 illustrates other exemplary pixel property distributions and edit profile parameters relative to an example image and tool impression.

FIG. 14 illustrates other exemplary pixel property distributions 1400 and edit profile parameters 1402 relative to an example image 1404 and tool impression 1406.

Figure 15:
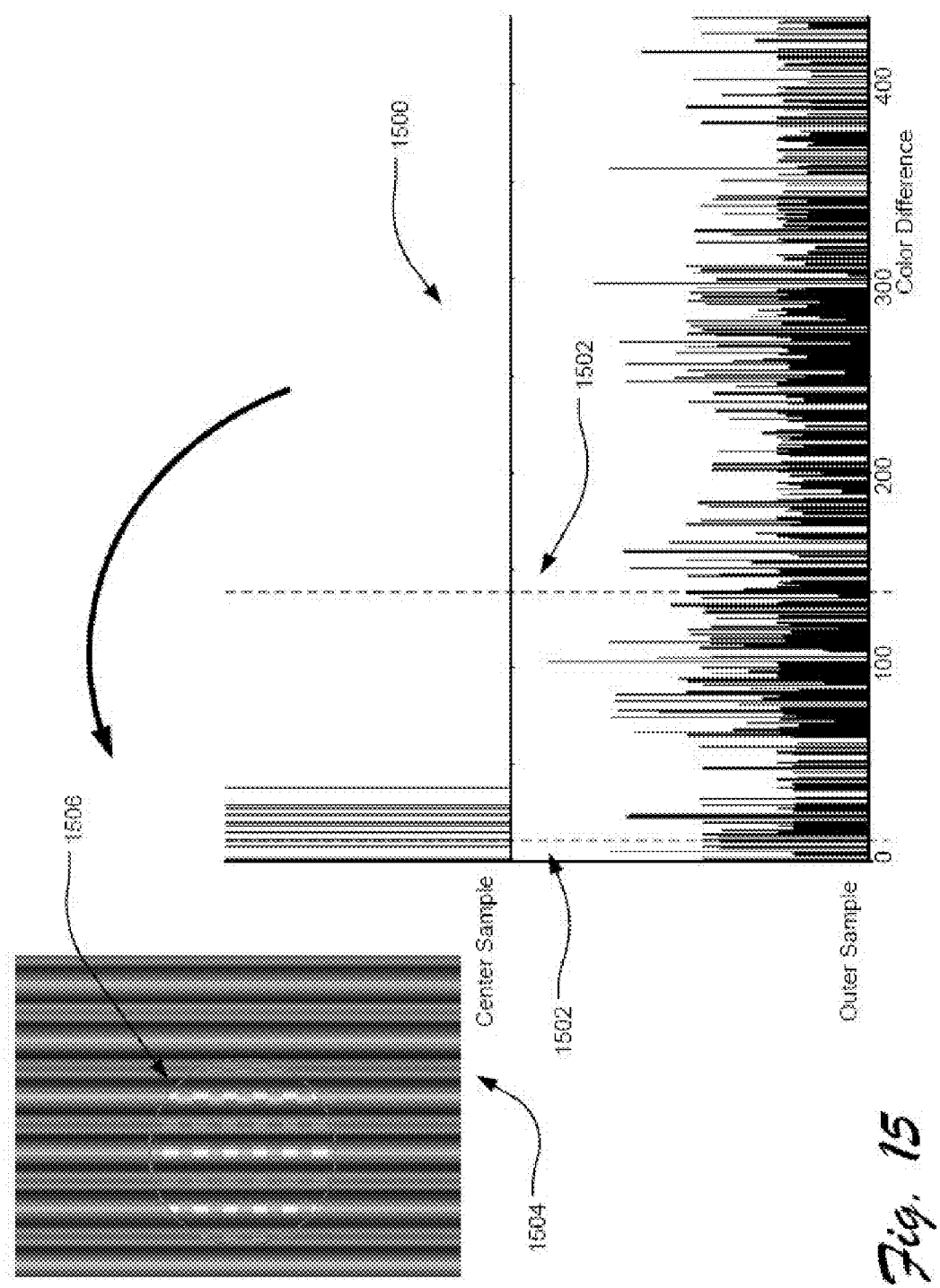
FIG. 15 illustrates other exemplary pixel property distributions and edit profile parameters relative to an example image and tool impression.

FIG. 15 illustrates other exemplary pixel property distributions 1500 and edit profile parameters 1502 relative to an example image 1504 and tool impression 1506.

Figure 16:
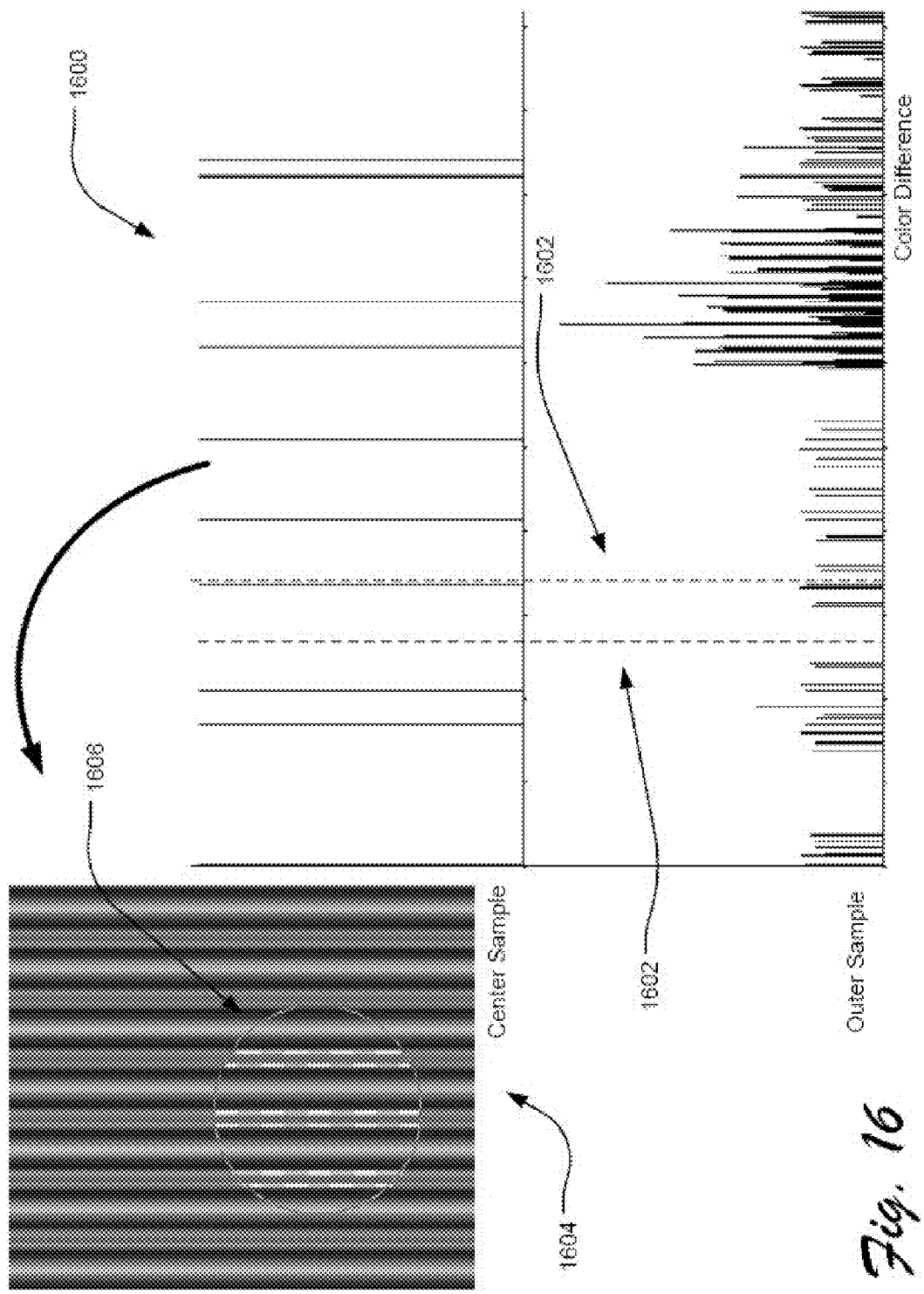
FIG. 16 illustrates other exemplary pixel property distributions and edit profile parameters relative to an example image and tool impression.

FIG. 16 illustrates other exemplary pixel property distributions 1600 and edit profile parameters 1602 relative to an example image 1604 and tool impression 1606.

Figure 17:
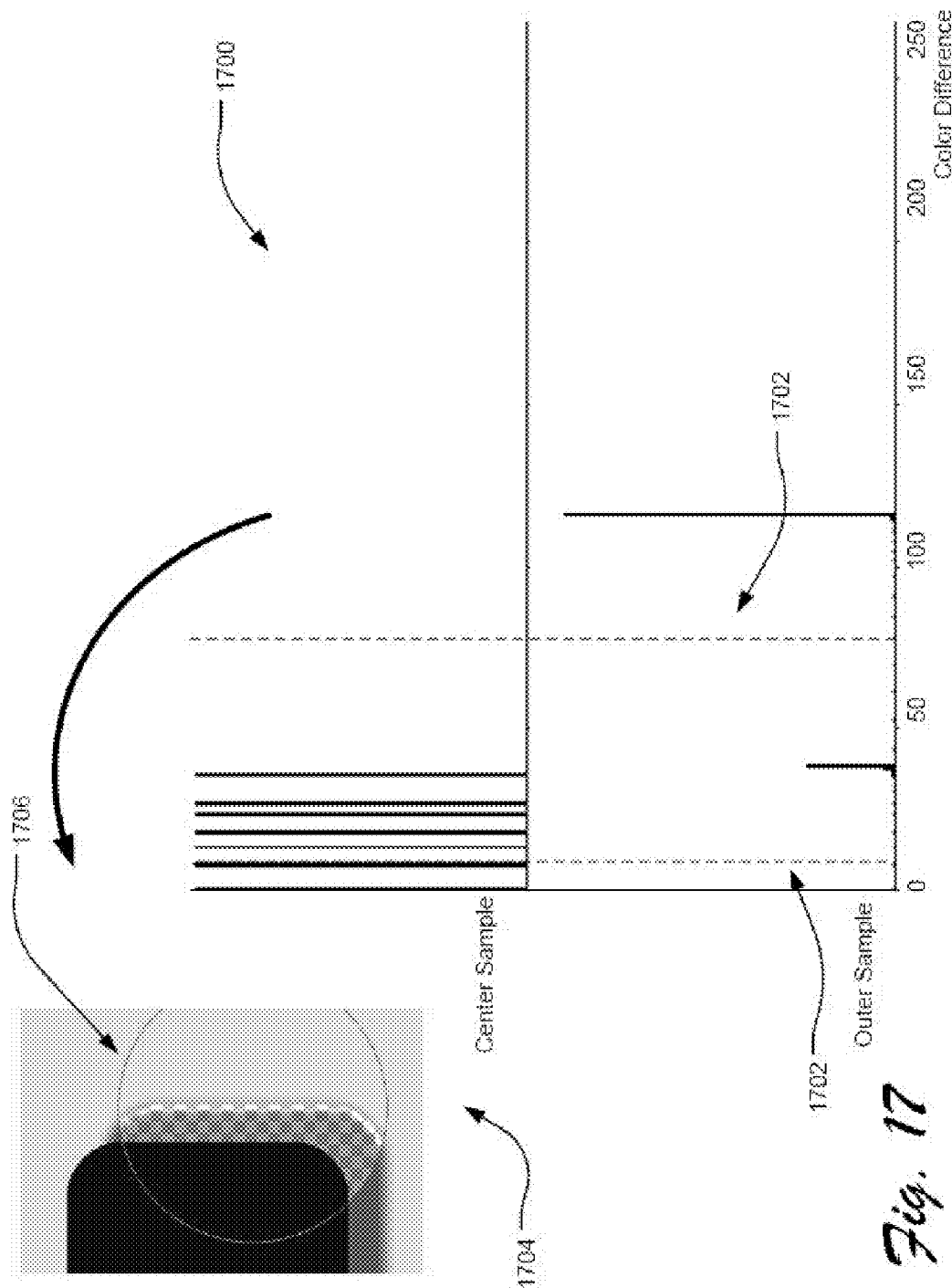
FIG. 17 illustrates other exemplary pixel property distributions and edit profile parameters relative to an example image and tool impression.

FIG. 17 illustrates other exemplary pixel property distributions 1700 and edit profile parameters 1702 relative to an example image 1704 and tool impression 1706.

Figure 18:
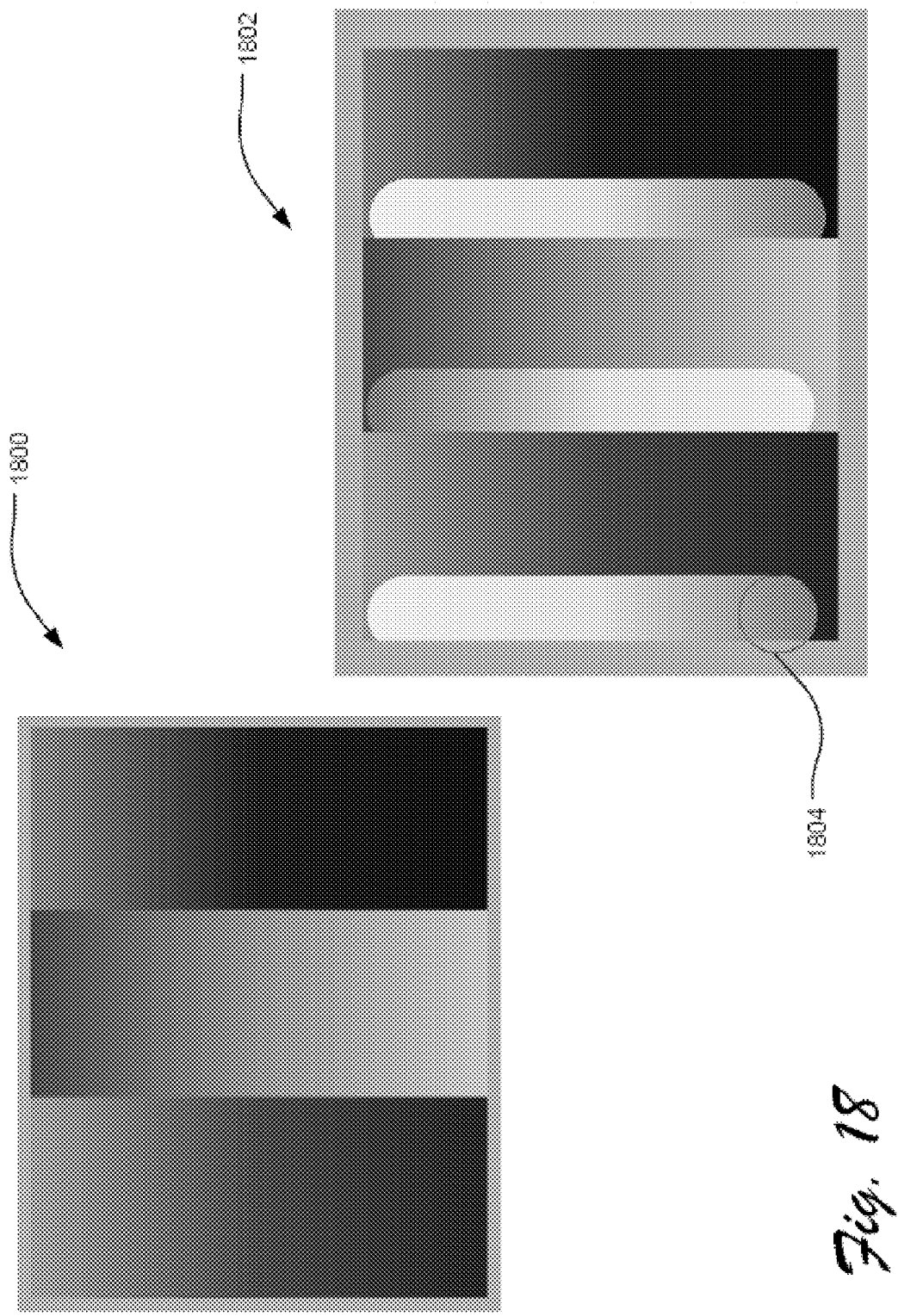
FIG. 18 illustrates an example of hue modification.

FIG. 18 illustrates an example of hue modification. An image 1800 includes three vertical stripes on a cyan field: red, green, and blue (from left to right). An image 1802 also has three vertical stripes on a cyan field: red, green, and blue (from left to right). An adaptive hue modification tool, the tool impression of which is show as circle 1804, has been used to selectively change the hue in a portion of each of the vertical stripes in image 1802 as the tool impression 1804 overlaps two color regions. The resulting modified portion of each vertical stripe is generally a yellow hue, with unchanged saturation and preservation of the original varying levels of lightness.

Figure 19:
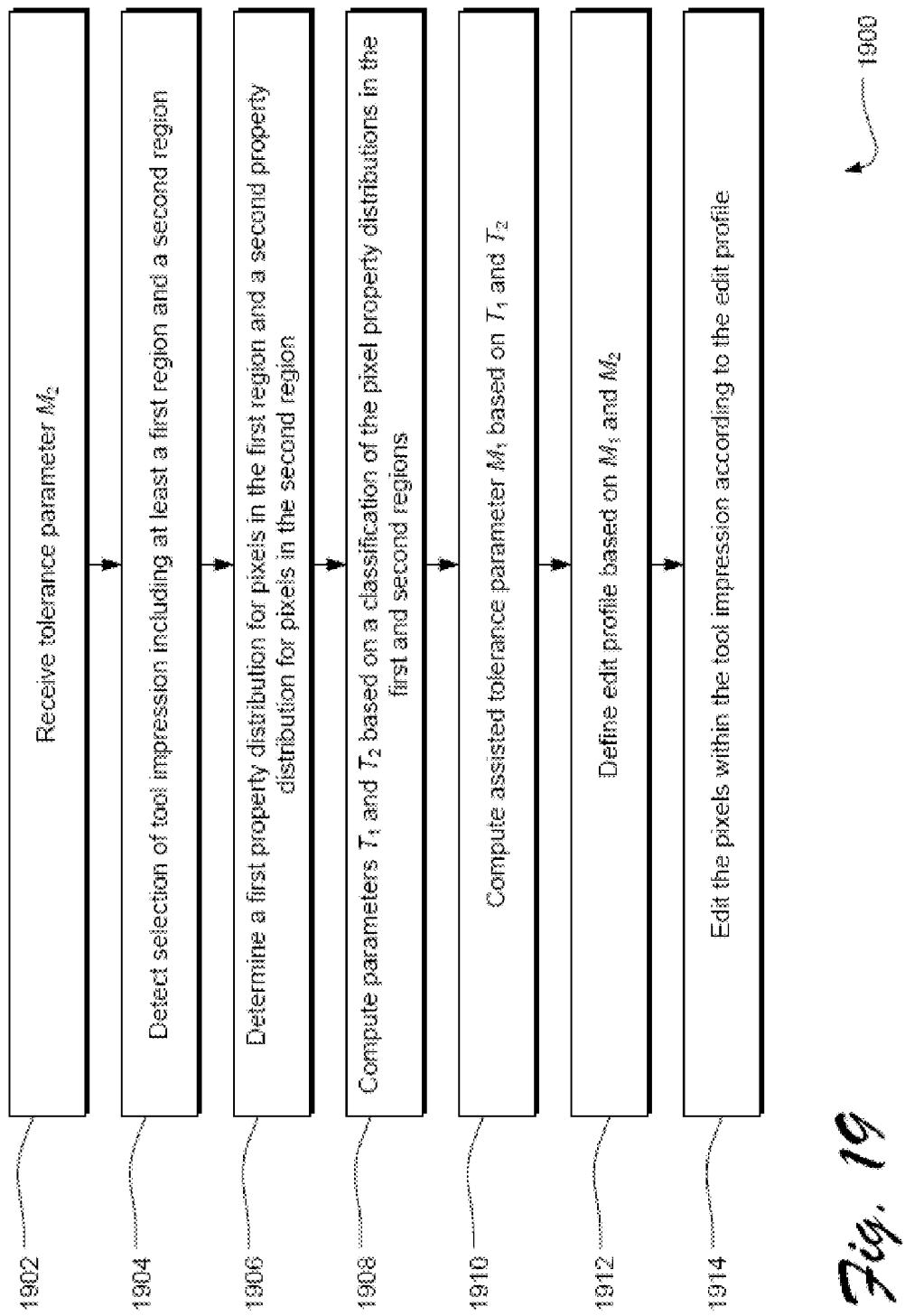
FIG. 19 illustrates operations performed by an exemplary assisted adaptive region editing tool.

FIG. 19 illustrates operations 1900 performed by an exemplary assisted adaptive region editing tool. An input operation 1902 receives a tolerance parameter M2, such as from user input, a configuration file, or some other source. In the screen shot in FIG. 1, for example, the user may set the tolerance parameter in a control 114. The tolerance parameter represents a type of assisted editing guidance input in that it specifies an edit profile characteristic. In the example described with regard to FIG. 19, the tolerance parameter represents a manually-set threshold, such as the boundary between the unchanged and the partial edit classes in FIG. 4; however, the edit profile characteristic specified by the tolerance parameter may alternatively define the boundary between the full edit and the partial edit classes in FIG. 4, an inflection point in an edit profile, or another edit profile characteristic.

A detection operation 1904 detects selection of a tool impression relative to a digital image. The selection defines at least a first region (e.g., a central region within the tool impression) and a second region (e.g., an outer region within the tool impression) within the tool impression. It should also be understood that FIG. 19 generally describes sequential processing for an individual tool impression, but that the same sequence of operations may be applied after selection of multiple tool impressions, such that an aggregate tool impression with an aggregate first region and an aggregate second region are processed.

A sampling operation 1906 determines property distributions for pixels within the first region and second regions. A classification operation 1908 computes parameters $T_1$ and $T_2$ based on the pixel property distributions within the first and second regions. Exemplary classification methods have been described herein. Given parameters $T_1$ and $T_2$, which in one implementation contribute to the adaptive editing as scaling parameters, an edit profile generator computes an assisted tolerance parameter $M_1$ based on $T_1$ and $T_2$ in operation 1910. In one implementation, the assisted tolerance parameter $M_1$ is computed using the following algorithm, although other algorithms may also be employed:

$$M_1 = \frac{T_1}{T_2} \times M_2$$

wherein the scaling parameters combine to create an adjustment factor $T_1/T_2$.

A definition operation 1912 then defines the edit profile based on tolerance parameters $M_1$ and $M_2$. An editing operation 1914 edits pixels under the tool impression in accordance with the generated edit profile.

The edit profile specifies the editing effects may be applied to pixels having properties in a given edit class. Accordingly, an editing operation 510 edits the pixels within the tool impression in accordance with the edit profile. For example, pixels in the erasure region may have their transparency values set to 100% while pixels in the partial erasure region may have their transparency values set to some value between 100% and 0% in accordance with the edit profile.

Alternative assisted adaptive editing tool approaches are described below, although other approaches are also contemplated.

1. Manual Color Editing
  a) Selecting a reference image pixel property—This property may be sampled from the image (e.g., at each tool impression) or supplied by the user by numerical specification or as a sample. This property may be a color, transparency, a non-color pixel property (e.g. a height in a height map), an image region property attached to a pixel (e.g. a texture specification), etc.
  b) Manual definition of a transformation function by the user—This transformation function (such as an edit profile) describes the amount of desired change of a color property of pixels in the image as a function of the difference of the given image pixel property from the reference image property. The reference property value may be determined from the image. The definition of the transformation function may be arbitrarily determined by the user and does not have to relate to property distributions in the image. The transformation function does not have to have a simple mathematical function definition—it, for instance, be defined by a spline. It is advantageous that any property difference input to the function generates a single desired amount of color modification. The color property that is modified may be the same as the image pixel property. However, in other implementations, the color property may be a color as normally understood, such as not including transparency, opacity, texture, or height.
  c) Editing the image—This operation involves placing the tool over the image to form a tool impression, or moving the tool over the image to form a path of tool impressions, and modifying a pixel property (such as a color property) according to the transformation function within the tool impression or path.

Constraints may be placed on the transformation function, including without limitation one or more of the following: (1)

that it is defined by at least two user inputs; or (2) that it specifies at least three distinct degrees of modification. (Alternatively, three different levels of modification, and so on, would also meet the requirement.)

2. Simple "Manual Plus Automatic" Color Editing
   a) Selecting a reference image pixel property—This property may be sampled from the image (e.g., at each tool impression) or supplied by the user by numerical specification or as a sample. This property may be a color, transparency, a non-color pixel property (e.g. a height in a height map), or an image region property attached to a pixel (e.g. a texture specification).
   b) Manual definition of a partial transformation function by the user—This transformation function describes the amount of desired change of a color property of pixels in the image as a function of the difference of the given image pixel property from the reference image property. The reference property value may be determined from the image. The definition of the transformation function is initially determined by the user and this initial aspect does not have to relate to property distributions in the image. The color property that is modified may be the same as the image pixel property. In one implementation, the color property may be limited to a color as normally understood—not transparency, opacity, texture, height or anything else.
   c) Defining complete transformation function—Completion of the definition of the of the transformation function by means of at least one parameter determined from a distribution of the image pixel property in a region of the tool impression. Here, completion means that transformation function is not usable for image modification or completely defined until both the user-supplied component and the automatically determined component is present.
   d) Editing the image—Placing or moving the tool over the image to form a path of tool impressions and modifying a pixel color property according to the transformation function within the path.

3. Complex "Manual Plus Automatic" Image Property Editing
   a) Selecting a reference image pixel property—This property may be sampled from the image (e.g., at each tool impression) or supplied by the user by numerical specification or as a sample. This property may be a color, transparency, a non-color pixel property (e.g. a height in a height map), or an image region property attached to a pixel (e.g. a texture specification).
   b) Manual definition of a partial transformation function by the user—This transformation function describes the amount of desired change of an image pixel property as a function of the difference of the previously given image pixel property from the reference image property. The definition of the transformation function is initially determined by the user and this initial aspect does not have to relate to property distributions in the image. The image pixel property that is modified may be the same as the image pixel property used to determine differences relative to the reference pixel property. Either pixel property may be a color as normally understood but also transparency, opacity, texture, height or anything else of this kind.
   c) Defining complete transformation function—Completion of the definition of the of the transformation function by means of at least two parameters determined from at least two distributions of the image pixel property in at least two regions of the tool impression. Here, completion means that transformation function is not usable for image modification or completely defined until both the user-supplied component and the automatically determined component is present. While here there is no requirement to classify the distribution of pixel properties in the image, it is permitted.
   d) Editing the image—Placing or moving the tool over the image to form a path of tool impressions and modifying an image pixel property according to the transformation function within the path.

Figure 20:
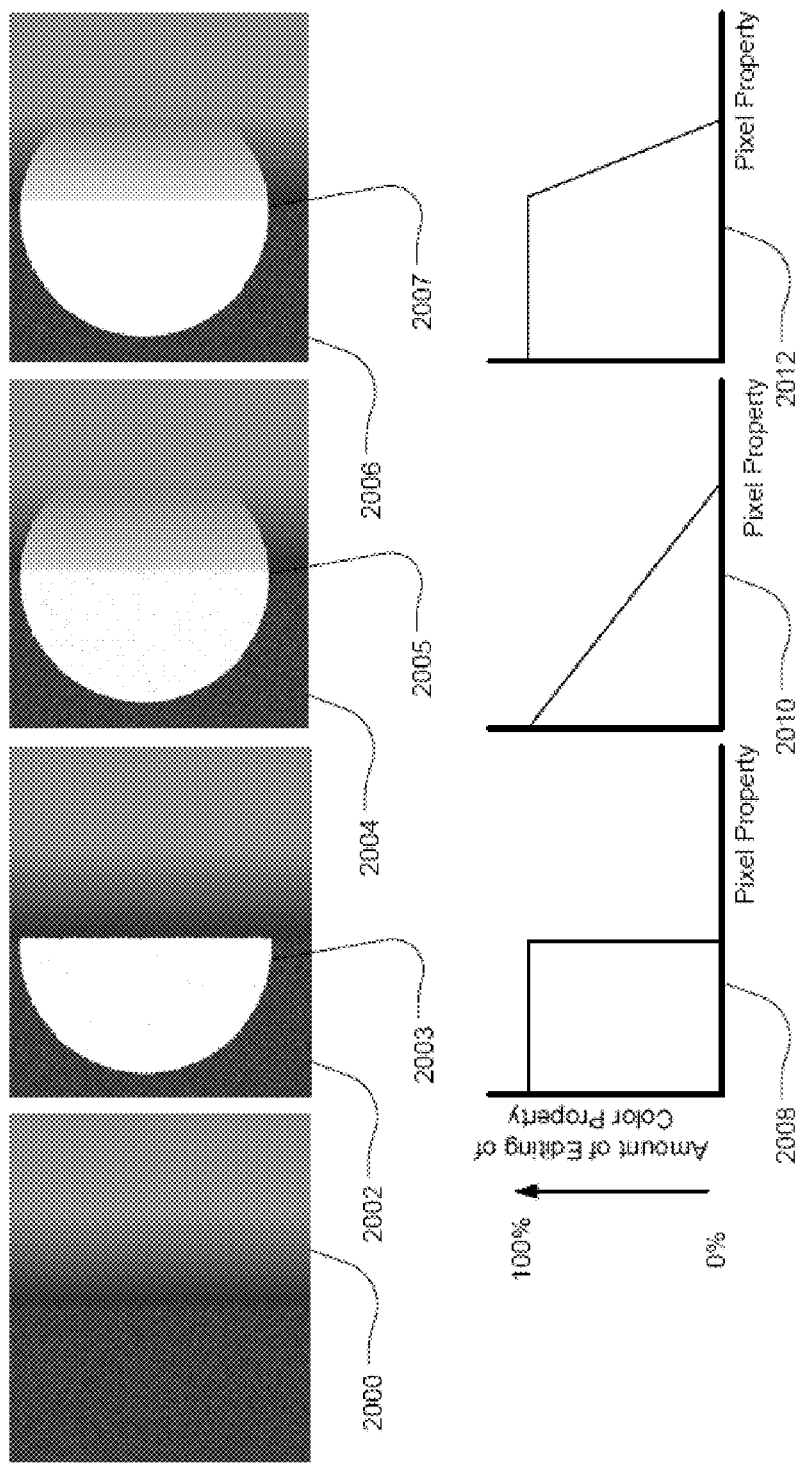
FIG. 20 illustrates examples of region editing based on two or more edit classes.

FIG. 20 illustrates examples of region editing based on two or more edit classes in digital images. Original image 2000 includes a textured colored region to the left, a transition region in the middle, and a solid colored region of a different hue and lightness to the right. In edited image 2002, a tool impression 2003 is applied to the original image 2000 with an edit profile 2008. The edit profile 2008 defines an amount of editing applied to a multidimensional color property versus a detected pixel property within the image. A multidimensional color property specifies a color space value of a pixel (e.g., RGB, L*a*b, HSV, etc.) or one or more components of the visual electromagnetic spectrum. In contrast, a pixel property may include color, transparency, texture, layer information, etc. and is not restricted to a color property. It should be understood that editing a multidimensional color property does not required a change in all dimensions of that property color space. Likewise, a zero value editing operation results in no change to the color property dimensions.

The edit profile 2008 designates two edit classes: a first edit class designating a non-zero value uniform editing operation on the left and second edit class designating a zero value uniform editing operation on the right. As shown in the image 2002, application of these edit classes result in nearly complete color replacement (i.e., replacing an image color with white) in the left side of the tool impression 2003 and no color replacement in the right of the tool impression 2003. It should be noted however that small specks of the texture in the left side of the tool impression 2003 remain as grey artifacts. The pixel properties of these grey specks fell within the zero value editing operation edit class, and therefore were not erased. Additionally, it should be noted that the color transition is not modified in proportion to the amount of left-hand color mixed with right-hand color as would be desirable and beneficial.

In edited image 2004, a tool impression 2005 is applied to the original image 2000 with an edit profile 2010. The edit profile 2010 designates two edit classes: a first edit class designating a variable editing operation on the left and a second edit class designating a zero value uniform editing operation on the right. Note that the color replacement is extends farther into the transition region of the image, but small grey specks remain in the left side of the tool impression 2005.

In edited image 2006, a tool impression 2007 is applied to the original image 2000 with an edit profile 2012. The edit profile 2012 designates three edit classes: a first edit class designating a non-zero uniform editing operation on the left, a second edit class designating a variable editing operation, and a third edit class designating a zero value uniform editing operation on the right. Note that the color replacement is extends farther into the transition region of the image and the small grey specs are gone in the left side of the tool impression 2007.

The edit profile 2012 provides increased flexibility of editing operation because multiple parameters may be adjusted. The edit classes are defined by a classification operation, which may be automatic (e.g., adaptive classification performed by the software controlling the editing tool), manual (e.g., by receiving one or more user-supplied parameters through the software controlling the editing tool), or a combination of both. For example, the boundaries of the edit classes may be automatically adjusted based the pixel properties of the image within the tool impression 207 or manually adjusted by user input. Likewise, the levels of uniform editing or the profile in the variable editing region may be adjusted.

It should also be understood that any number of edit classes may be defined for a given edit profile, and uniform and variable edit operations may be associated with each individual edit class. In one implementation, a user may specify through the tool software the type, magnitude and/or profile of the editing operation associated with a given edit class. Alternatively, the association may be adaptively assigned by the software or the association may be determined by reference to a predefine edit class association parameter stored in memory. The editing operation (e.g., erasure, color replacement, blurring, etc.) may be accomplished by the software tool, such as described elsewhere herein.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. In addition, data structures may be represented by individual objects, defined data structures, individual database tables, or combinations of associated database tables. A data field of a data structure may be represented or referenced by one or more associated database table fields.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
   sampling pixels within first and second component regions of a tool impression in a digital image;
   determining for each of the first and second component regions respectively a distribution using a processing unit, each of the resulting first and second distributions relating to a pixel property of the sampled pixels within the respective first and second component regions;
   computing an adjustment factor based on the distribution of the pixel property using the processing unit, based upon both the first and second distributions;
   receiving a predetermined parameter that is independent of both the first and second distributions of the pixel property;
   computing an assisted tolerance parameter based on the adjustment factor and the predetermined parameter using the processing unit;
   specifying a first edit class of a plurality of edit classes based upon the predetermined parameter and the assisted tolerance parameter, wherein each edit class defines one or more respective subsets of the distribution;
   determining for each pixel within the first edit class of the plurality of edit classes a weighting using the processing unit; and
   collectively editing using the processing unit the subset of sampled pixels that correspond to one of the subsets of the distribution defined by the first edit class by applying a first edit operation to each pixel in the subset of the sampled pixels using the processing unit, the first edit operation for each pixel being determined in dependence upon at least the determined weighting for that pixel, the predetermined parameter and the assisted tolerance parameter.

2. A method according to claim 1 wherein;
   the weighting is calculated in dependence upon at least one of a probability for the pixel being within the first edit class rather than another one of the plurality of edit classes and an aspect of the tool impression.

3. A method according to claim 1 wherein;
   the first edit operation is further determined in dependence upon a second edit operation intended to be performed upon the subset of the sampled pixels that correspond to another one of the subsets of the distribution defined by a second edit class, the second edit class comprising a first predetermined portion of pixels that are adjacent to a second predetermined portion of pixels that are within the first edit class.

4. A method according to claim 1 wherein,
   receiving the predetermined parameter comprises at least one of receiving a user defined specification through a user interface, receiving an entry from a configuration file, and establishing the parameter in dependence upon at least one of the first distribution and the second distribution.

5. A method according to claim 1 further comprising;
   applying a first edit operation comprises applying an operation selected from a plurality of predetermined operations, the operation selected being determined in dependence upon at least one of the first distribution, the second distribution, an aspect of the tool impression, an aspect of the digital image, and a preceding operation selection relating to a preceding tool impression.

6. A method according to claim 1 wherein,
   computing an assisted tolerance parameter comprises applying a predetermined mathematical process using the processing unit, the mathematical process determined in dependence upon at least one of an aspect of the tool impression, an aspect of the digital image, a characteristic of the digital image specified by the predetermined parameter, and an aspect of the processing unit.

7. A method according to claim 1 further comprising;
   generating an edit profile defining boundaries between edit classes wherein pixels within the boundaries have a probability of being within the edit class of the plurality of edit classes that is lower than a predetermined threshold.

8. A method according to claim 7 wherein,
   the predetermined threshold is determined in dependence upon at least one of an aspect of the tool impression, the predetermined parameter, the first distribution, the second distribution, the edit operation to be applied to the pixels within the first edit class and the edit operation to be applied to the pixels within the other edit class of the plurality of edit classes.

9. One or more non-transitory computer readable storage media storing executable code for executing on a computer system a computer process, the computer process comprising the steps of:
   sampling pixels within first and second component regions of a tool impression in a digital image;

determining for each of the first and second component regions respectively a distribution using a processing unit, each of the resulting first and second distributions relating to a pixel property of the sampled pixels within the respective first and second component regions;

computing an adjustment factor based on the distribution of the pixel property using the processing unit, based upon both the first and second distributions;

receiving a predetermined parameter that is independent of both the first and second distributions of the pixel property;

computing an assisted tolerance parameter based on the adjustment factor and the predetermined parameter;

specifying a first edit class of a plurality of edit classes based upon the predetermined parameter and the assisted tolerance parameter, wherein each edit class defines one or more respective subsets of the distribution;

determining for each pixel within the first edit class of the plurality of edit classes a weighting using the processing unit; and collectively editing using the processing unit the subset of sampled pixels that correspond to one of the subsets of the distribution defined by the first edit class by applying a first edit operation to each pixel in the subset of the sampled pixels using the processing unit, the first edit operation for each pixel being determined in dependence upon at least the determined weighting for that pixel, the predetermined parameter and the assisted tolerance parameter.

10. The non-transitory computer readable media of claim 9 wherein the executable code further establishes that,
the weighting is calculated in dependence upon at least one of a probability for the pixel being within the first edit class rather than another one of the plurality of edit classes and an aspect of the tool impression.

11. The non-transitory computer readable media of claim 9 wherein the executable code further establishes that,
the first edit operation is further determined in dependence upon a second edit operation intended to be performed upon the subset of the sampled pixels that correspond to another one of the subsets of the distribution defined by a second edit class, the second edit class comprising a first predetermined portion of pixels that are adjacent to a second predetermined portion of pixels that are within the first edit class.

12. The non-transitory computer readable media of claim 9 wherein the executable code further establishes that,
receiving the predetermined parameter is accomplished by at least one of receiving a user defined specification through a user interface, receiving an entry from a configuration file, and establishing the parameter in dependence upon at least one of the first distribution and the second distribution.

13. The non-transitory computer readable media of claim 9 wherein the executable code further comprises executable code for;
applying a first edit operation comprises applying an operation selected from a plurality of predetermined operations, the operation selected being determined in dependence upon at least one of the first distribution, the second distribution, an aspect of the tool impression, an aspect of the digital image, and a preceding operation selection relating to a preceding tool impression.

14. The non-transitory computer readable media of claim 9 wherein the executable code further establishes that,
computing an assisted tolerance parameter is accomplished by applying a predetermined mathematical process, the mathematical process determined in dependence upon at least one of an aspect of the tool impression, an aspect of the digital image, a characteristic of the digital image specified by the predetermined parameter, and a1n aspect of the processing unit.

15. The non-transitory computer readable media of claim 9 wherein the executable code further comprises executable code for;
generating an edit profile defining boundaries between edit classes wherein pixels within the boundaries have a probability of being within the edit class of the plurality of edit classes that is lower than a predetermined threshold.

16. The non-transitory computer readable media of claim 15 wherein the executable code further establishes that,
the predetermined threshold is determined in dependence upon at least one of an aspect of the tool impression, the predetermined parameter, the first distribution, the second distribution, the edit operation to be applied to the pixels within the first edit class and the edit operation to be applied to the pixels within the other edit class of the plurality of edit classes.

17. A method of editing pixels in a specified region of a digital image, the specified region being defined by a tool impression, the method comprising:
receiving a predefined tolerance parameter specifying a first alternative characteristic for the edit profile;
sampling pixels within the tool impression in the digital image to determine a distribution of a pixel property of the pixels in the tool impression using a processing unit;
calculating a minimum tolerance parameter for an edit profile within the distribution using the processing unit;
calculating a maximum tolerance parameter for the edit profile within the distribution using the processing unit;
computing an assisted tolerance parameter as a function of the predefined tolerance parameter scaled by a ratio of the minimum tolerance parameter to the maximum tolerance parameter, wherein the assisted tolerance parameter specifies a second alternative characteristic for the edit profile using the processing unit;
establishing one or more edit classes based upon the predefined tolerance parameter and the assisted tolerance parameter, wherein the edit classes comprise subsets of the sampled pixels within the distribution;
determining for each pixel within the first edit class of the plurality of edit classes a weighting using the processing unit; and
collectively editing using the processing unit the subset of sampled pixels that correspond to one of the subsets of the distribution defined by the first edit class by applying a first edit operation to each pixel in the subset of the sampled pixels using the processing unit, the first edit operation for each pixel being determined in dependence upon at least the determined weighting for that pixel, the first alternative characteristic, and the second alternative characteristic.

18. A method according to claim 17 wherein,
the weighting is calculated in dependence upon at least one of a probability for the pixel being within the first edit class rather than another one of the plurality of edit classes and an aspect of the tool impression.

19. A method according to claim 17 wherein,
sampling the pixels comprises determining which pixels are to be sampled in dependence upon at least one of the predetermined tolerance parameter, an aspect of the tool impression, and an aspect of the digital image.

20. A method according to claim 17 wherein, receiving the predetermined parameter comprises at least one of receiving a user defined specification through a user interface, receiving an entry from a configuration file, and establishing the parameter in dependence upon at least one of the first distribution and the second distribution.

21. A method according to claim 17 further comprising;
deriving an edit profile characteristic in dependence upon at least one of the first distribution, the second distribution, an aspect of the tool impression and an aspect of the digital image.

22. A method according to claim 17 wherein,
computing an assisted tolerance parameter comprises applying a predetermined mathematical process using the processing unit, the mathematical process determined in dependence upon at least one of an aspect of the tool impression, an aspect of the digital image, a characteristic of the digital image specified by the predetermined parameter, and an aspect of the processing.

23. A method according to claim 17 further comprising;
generating an edit profile defining boundaries between edit classes wherein pixels within the boundaries have a probability of being within the edit class of the plurality of edit classes that is lower than a predetermined threshold.

* * * * *